United States Patent [19]
Parker et al.

[11] Patent Number: 4,783,107
[45] Date of Patent: Nov. 8, 1988

[54] METHOD AND APPARATUS FOR CONTROLLING IMPACT FORCE DURING RAPID ROBOTIC ACQUISITION OF OBJECT

[75] Inventors: Joey K. Parker, Tuscaloosa, Ala.; Frank W. Paul, Seneca, S.C.

[73] Assignee: Clemson University, Clemson, S.C.

[21] Appl. No.: 120,755

[22] Filed: Nov. 12, 1987

Related U.S. Application Data

[63] Continuation of Ser. No. 741,277, Jun. 4, 1985, abandoned.

[51] Int. Cl.$^4$ .............................................. B66C 1/00
[52] U.S. Cl. ..................................... 294/88; 294/907; 901/36; 901/39; 901/46
[58] Field of Search .................... 294/88, 907; 901/36, 901/39, 46

[56] References Cited

U.S. PATENT DOCUMENTS

| | | | |
|---|---|---|---|
| 3,226,833 | 1/1966 | Lemelson | 901/33 X |
| 3,888,362 | 6/1975 | Fletcher et al. | 901/35 X |
| 3,948,093 | 4/1976 | Folchi et al. | 901/34 X |
| 4,204,959 | 5/1977 | Gruner . | |
| 4,350,381 | 9/1982 | Hellman | 294/88 |
| 4,365,928 | 12/1982 | Baily | 901/22 X |
| 4,423,998 | 1/1984 | Inaba et al. | 294/907 X |
| 4,533,167 | 8/1985 | Johnson | 901/32 X |
| 4,562,551 | 12/1985 | Inaba et al. | 318/568 M |
| 4,579,380 | 4/1988 | Zaremsky et al. | 901/33 X |
| 4,593,948 | 6/1986 | Borcea et al. | 294/907 X |

FOREIGN PATENT DOCUMENTS

| | | | |
|---|---|---|---|
| 53-145260 | 12/1978 | Japan . | |
| 56-80710 | 7/1981 | Japan . | |
| 57-02607 | 8/1982 | Japan | 901/20 |
| 8404723 | 12/1984 | PCT Int'l Appl. | 294/907 |
| 887157 | 12/1981 | U.S.S.R. . | |
| 2058714 | 4/1981 | United Kingdom | 901/34 |

OTHER PUBLICATIONS

Brown, M. K., "Computer Simulation of a Controlled Impedance Robot Hand," International Conference of Robotics, Atlanta, Mar., 1984, pp. 442–447.

Pessen, David, "Tactile Gripper System for Robotic Manipulators," 12th International Symposium on Industrial Robots, Paris, 1982, pp. 411–414.

Witwicki, A. T., "A Method of Non-Positioned Workpieces Taking," 9th International Symposium on Industrial Robots," Tokyo, 1979, pp. 489–492, 494 and 501.

Edel, M. and D. Jolly, "Conception and Realization of an Intelligent and Autonomous End Effector," Robot VI Conference, Detroit, Mich., Mar., 1982, pp. 552–554 and 557.

Palm, W., D. Martino, and P. Datersis, "Coordinated Control of a Robot Hand Possessing Multiple Degrees of Freedom," in Control of Manufacturing Process and Robotic Systems, ASME 1983 Winter Annual Meeting, pp. 1, 2a, 12 and 15.

Salisbury, J. K., and J. J. Craig, "Articulated Hands: Force Control and Kinematic Issues," The International Journal of Robotics Research, vol. 1, No. 1, 1982, pp. 4, 12 and 14.

Wang, S. S. M. and P. M. Will, "Sensors for Computer Controlled Mechanic Assembly," The Industrial Robot, Mar. 1978, pp. 9–11 and 13.

Craig, J. J. and M. H. Raibert, "A Systematic Method of Hybrid Position/Force Control of a Manipulator," IEEE #CH1515-6/79/0000-0446, pp. 446–447.

Johnston, A. R., "Proximity Sensor Technology for Manipulator End-Effectors," Mechanism and Machine Theory, vol. 12, 1977, pp. 95–108.

*Primary Examiner*—Robert J. Spar
*Assistant Examiner*—Jennifer L. Doyle
*Attorney, Agent, or Firm*—Dority & Manning

[57] ABSTRACT

Proximity sensors are used to sense impending contact, i.e., a point of close approach, between a finger of a robot hand and an object. Each finger is equipped with force sensors so that finger touch force with the object can be measured and controlled. The hand is controlled by a dedicated microprocessor, which communicates with a robot arm controller through 8 digital input/output lines. A novel "bi-modal" control system uses information from the proximity sensors to control both solenoid (on/off) valves and a proportional servovalve which are alternatively switched into an operative mode in a pneumatic circuit which powers the pneumatic actuators of the hand. This control design achieves the two goals of rapid object acquisition and low interaction forces. Each finger of the hand is capable of implementing an acquisition strategy in which mislocated objects can be acquired.

22 Claims, 9 Drawing Sheets

METHOD AND APPARATUS FOR CONTROLLING IMPACT FORCE DURING RAPID ROBOTIC ACQUISITION OF OBJECT

This is a continuation of application Ser. No. 06/741,277, filed June. 4,1985, which was abandoned upon the filing thereof.

BACKGROUND OF THE INVENTION

This invention relates to a method and apparatus for controlling the grasping of an object by a robotic hand. The Robot Industries Association defines an "end-effector" as, "an actuator, gripper, or mechanical device attached to the wrist of a manipulator by which objects can be grasped or otherwise acted upon." In this specification, the term "robot hand" or "hand" will be used to describe the subset of "end-effectors" that are used for grasping objects and which have some resemblance to the human hand. The term "robot" or "robot system" indicates the combination of the robot hand and a robot arm. As used in this specification, the term "acquisition envelope" is an imaginary volume attached to the robot hand and inside of which the object to be grasped must fit for successful grasping. The shape and dimensions of this imaginary volume are functions of the hand kinematics, the geometry of the grasped object, and the environment in which acquisition occurs. The present invention assumes that the robot arm has sufficient capabilities to position the "acquisition envelope" of the robot hand to surround the object to be grasped within the acquisition envelope, but the exact location of the object is not necessarily known.

The manipulation of objects, which are those material things perceptible by one or more of the senses such as vision or touch, is an important requirement for automated manufacturing activities such as assembly, machine loading/unloading and tool. Many of these tasks can be done by industrial robots having a mechanism for grasping, gripping and acquisition of objects.

One problem which limits the use of robots in such activities is the lack of generality that is associated with the hand designs. The requirement for robots to have a wide variety of robot hand designs results from the variety of physical characteristics of the object, such as size, weight, stiffness, fragility, etc. For example, many robot hands are designed to grasp particular objects, making these hands unsuitable for grasping other objects and resulting in custom-designed end-effectors for use with only one or two different objects. It has been estimated that such customized hands often represent 20 to 30 percent of the total robot system cost. Such lack of hand generality requires a new design for each activity or application. The resulting requirement for new hand designs with each change of manipulated object detracts from robot flexibility in many industrial manufacturing applications.

When a robot hand structure acquires or holds an object, the interaction force and moment between the hand and the object can be applied in a controlled or an uncontrolled mode. In an uncontrolled mode, the velocity and position of the closing hand is not controlled. Current industrial robot hand designs often do not control the velocity of hand closure and force application to an object, but rather apply forces in an uncontrolled or "impacting mode" to the object. The impact force is a dynamic force, which is approximately proportional to the contact velocity, i.e., the velocity of the hand member as that member contacts the object, and the square root of finger mass and equivalent stiffness. The contact velocity is sometimes called the impact velocity. Stiffness is the inverse of compliance and represents the ability of the object to store energy due to deformations from applied forces which occur during acquisition of the object by a robot hand. Such energy is not dissipated, but may create motion of the object or is returned to the hand while grasping the object.

When the relative velocity of the contacting implements of the hand is zero, the interaction force consists of a static force, which is the touch force between the hand implement and the object.

One way in which the control of hand-object force interactions has been traditionally accomplished has been through the use of compliant pads of foam or rubber on the fingertips to reduce contact forces, i.e., to dissipate the energy associated with the impact forces. This solution requires a variety of fingertip materials for acquisition of objects and also results in the loss of positioning accuracy for the highly compliant padded finger.

A second approach to limiting hand-object force interaction has been .by reducing the finger closure velocity of the hand by using reduced speed drives. This would correspond to using restrictions in the supply pressure to pneumatic drives. Such use of uniform finger velocity reduction to control the handobject acquisition forces usuallyreduces the gripping force which can be statically applied to the object for secure holding. Such finger velocity reduction also directly increases the acquisition cycle time, resulting in an undesirable hand design characteristic, namely unduly slow acquisition of an object.

OBJECTS AND SUMMARY OF THE INVENTION

One of the principal objects of the present invention is to provide a method and apparatus for preventing the grasping fingers of a robot from generating large impact forces when grasping an object.

A further object of the invention is to provide a method and apparatus for preventing the grasping fingers of a robot from generating large impact forces when grasping an object, while at the same time suffering only minimal loss in the speed of the grasping operation.

Another object of the present invention is to provide an apparatus and method capable of grasping a wide variety of objects with many different characteristics such that object acquisition is achieved quickly, but with a minimal impact or contact velocity which could cause damage to the object.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an apparatus for controlling the grasping of an object located within the acquisition envelope of a robot hand having means for contacting the object, comprises means for imparting a first velocity to the contacting means in a first direction; sensory means for sensing a point of close approach between the object and the contacting means; means for braking said first velocity to a second velocity in the first direction; and means for controlling the touch force of the contacting means with the object.

The objects and the purpose of the present invention also are accomplished by a method of controlling the grasping of an object located within the acquisition envelope of a robot hand having means for contacting the object, the method comprising imparting a first velocity to the contacting means in a first direction; sensing a point of close approach between the contacting means and the object; braking the first velocity to a second velocity; and controlling the touch force of the contacting means with the object.

The accompanying drawings, which are incorporated in and constitute a part of this specification, illustrate the embodiments of the invention and, together with the description, serve to explain the principles of the invention.

BRIEF DESCRIPTION OF THE DRAWINGS OF THE PREFERRED EMBODIMENTS

DESCRIPTION OF THE PREFERRED EMBODIMENTS

Reference will now be made in detail to the present preferred embodiments of the invention, examples of which are illustrated in the accompanying drawings.

In accordance with the invention, an apparatus for controlling the grasping of an object located within the acquisition envelope of a robot hand having means for contacting the object, comprises means for imparting a first velocity to the contacting means in a first direction; sensory means for sensing a point of close approach between the object and the contacting means; means for braking said first velocity to a second velocity in said first direction; and means for controlling the touch force of the contacting means with the object.

Figure 1:
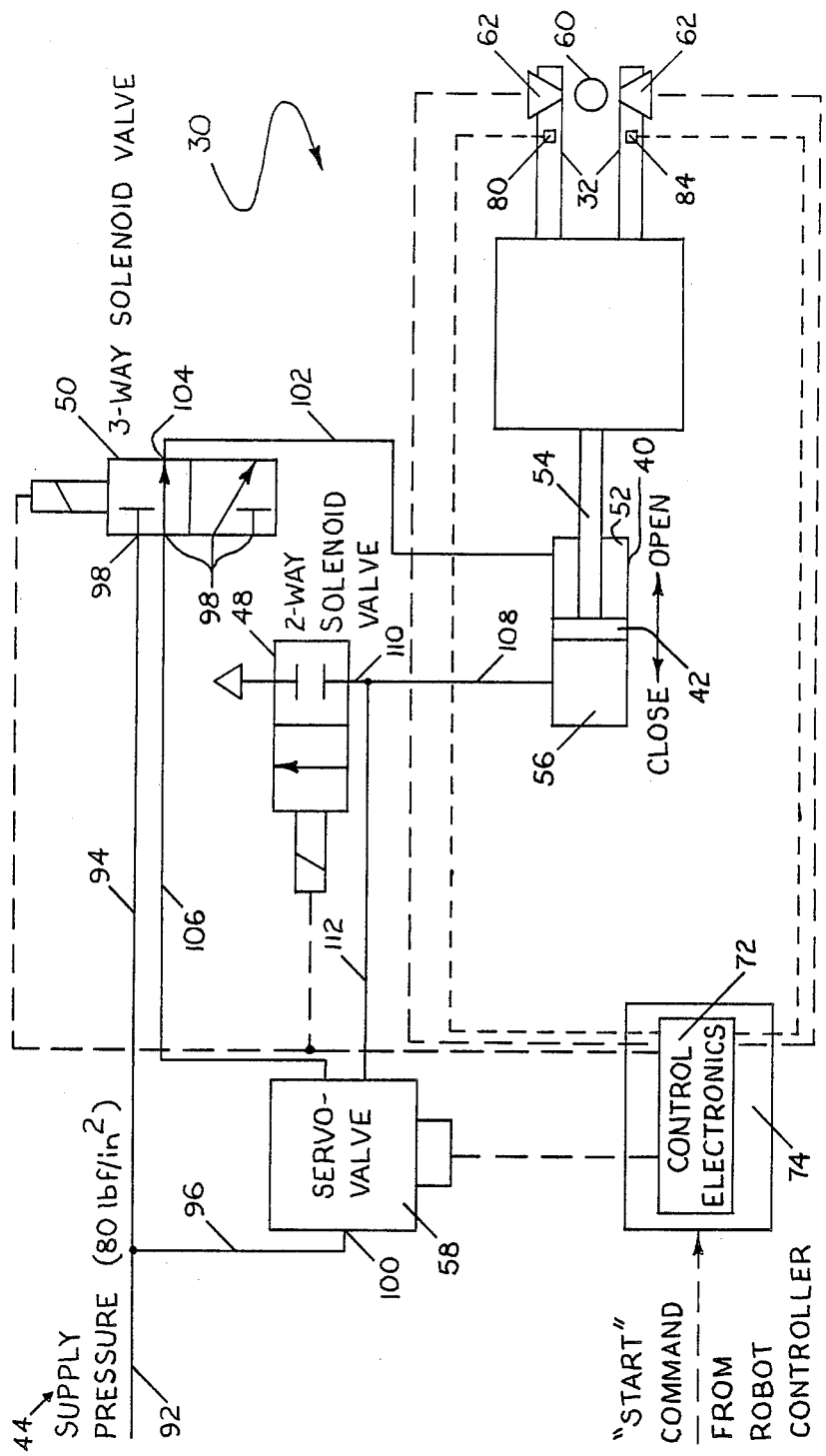
FIG. 1 is a block diagram of an embodiment of the present invention.

The preferred embodiment of an apparatus for controlling the robotic grasping of an object is shown schematically in FIG. 1 and is represented generally by the numeral 30.

Figure 2:
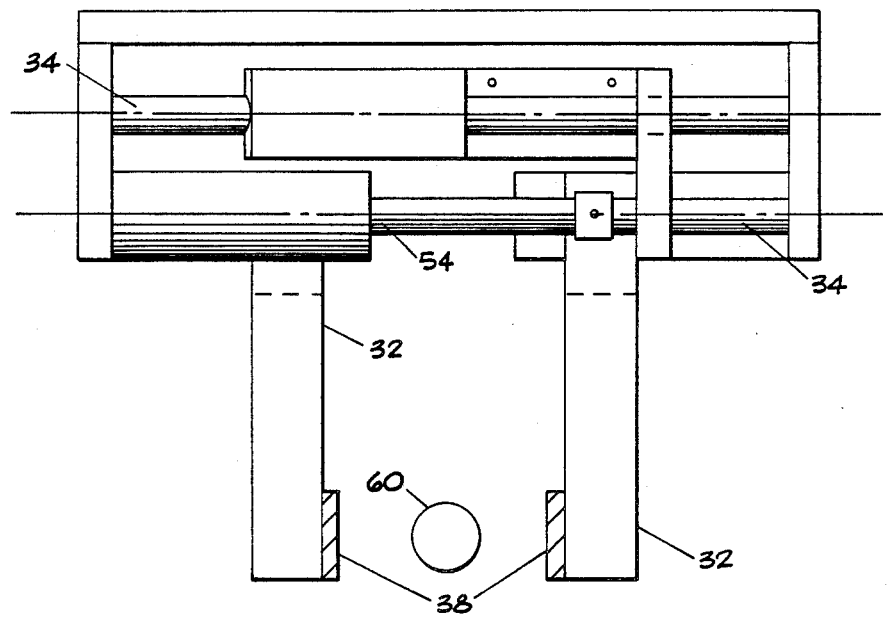
FIG. 2 is a top plan view of an embodiment of a two-degree of freedom robot hand according to an embodiment of the present invention.
Figure 3:
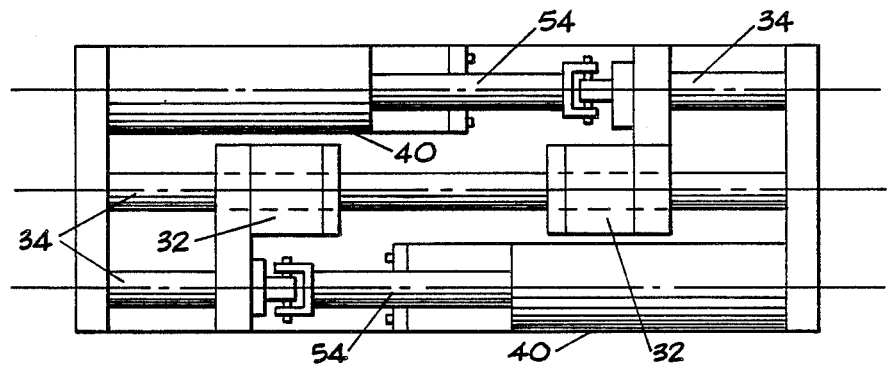
FIG. 3 is a perspective view of the hand of FIG. 2.

The preferred embodiment of the apparatus for controlling the grasping of an object includes a robot hand having means for contacting an object which is located within the acquisition envelope of the hand. As embodied herein and shown or example in FIGS. 2 and 3, the means for contacting the object includes a stiff robot finger 32 moveable in at least two directions along a pair of parallel steel shafts 34. As shown in FIGS. 2 and 3, each finger is supported by linear ball bushings which ride on two parallel steel shafts 34. There are three parallel steel shafts 34 in all, and one of these shafts is a middle shaft, which is shared by both fingers. Each of the two remaining shafts supports only one of the two fingers. Referring to FIG. 3, the uppermost shaft is toward the back and away from the middle shaft, and the lower shaft is directly underneath the uppermost shaft, and toward the back relative to the middle shaft. The fingers can open to a maximum separation distance of approximately 8 inches (20 cm), which provides a large acquisition envelope.

Figure 4:
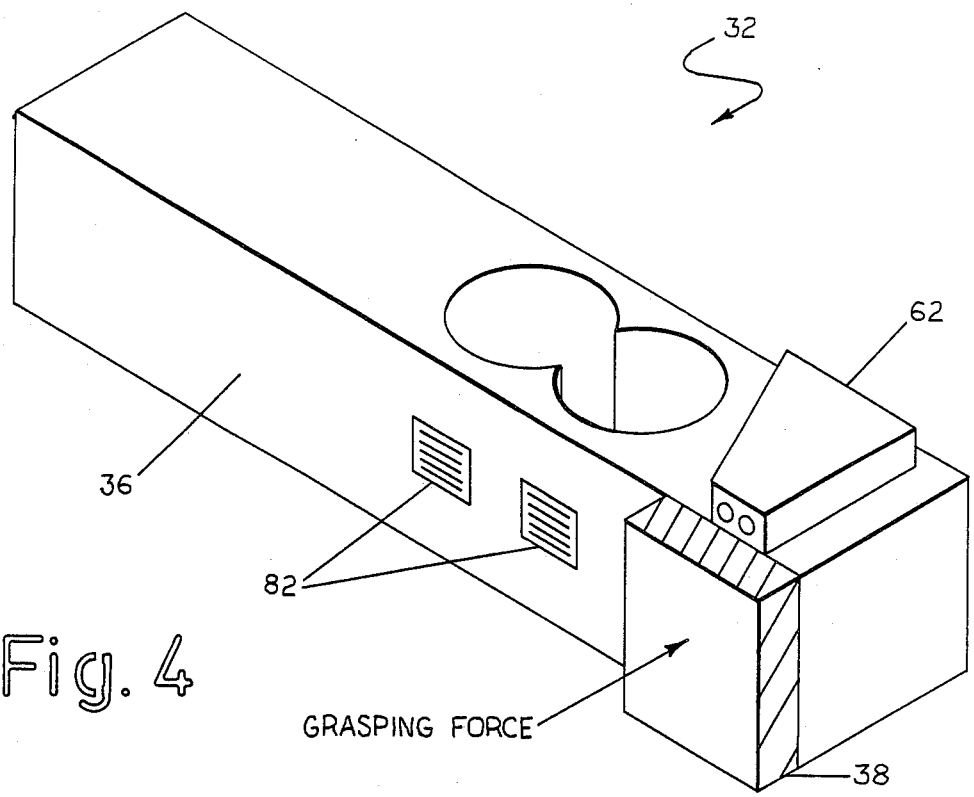
FIG. 4 is a schematic illustration of one embodiment of a force sensor mounted on an embodiment of a finger of a hand according to the invention.

A more detailed embodiment of finger 32 is shown in FIG. 4. The surface of each finger facing towards the acquisition envelope is designated a closing surface 36 because it closes on the object during the grasping operation. At the free end of each finger is a fingertip 38, which may be formed of polyurethane and is mounted on the closing surface of each finger.

In accordance with the invention, the apparatus for controlling the robotic grasping of an object includes means for imparting a first velocity to the contacting means in a first direction. As embodied herein and shown for example in FIG. 5, the means for imparting a first velocity to the contacting means in a first direction includes a pneumatic cylinder 40 having a piston 42 therein connected to a pneumatic pressure supply circuit generally designated 44 and having two bang-bang (on/off) pneumatic valves 46, 48.

Figure 5:
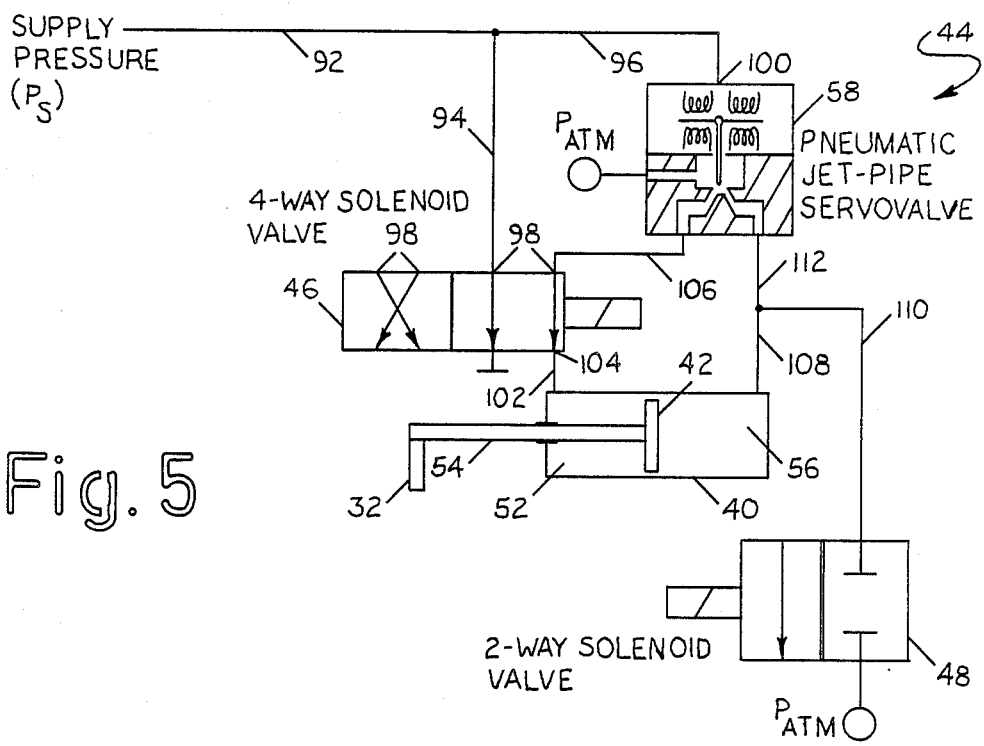
FIG. 5 is a schematic diagram of bi-modal control system components arranged in accordance with the preferred embodiment of the present invention.

The schematic of FIG. 5 shows two pneumatic solenoid valves used in the bang-bang pneumatic valve system for each finger of the preferred embodiment of the present invention. The on/off solenoid valves used in the embodiment of FIG. 5, for example, are: (1) a plugged 4-way solenoid valve—Alkon #239R2 r22, and (2) a 2-way solenoid valve—Skinner #V58ADA1050, orifice ⅛-3/32. The two solenoid valves were selected because of availability, however, equivalent valves could be substituted, such as a 3-way valve 50 of FIG. 1 for the plugged 4-way valve of FIG. 5.

The pneumatic cylinders actuating the fingers are Compact Air #S-1⅛×4 models. Each cylinder is divided into a first chamber 52 on the side of the piston attached to a piston rod 54 and a second chamber 56 on the other side of the piston. Each cylinder has a 4 inch (10 cm) stroke. As shown in FIG. 3 for example, the end of piston rod 54 opposite to the end attached to piston 42, is attached to a finger.

FIG. 1 shows that a pneumatic servovalve 58 described hereinafter) is commanded to hold each finger in the maximum open position before the robot hand is commanded to grasp an object 60. When the "start" command is received from the robot hand controller described hereinafter), the two solenoid valves are activated. The 3-way solenoid valve supplies a large low of air from the supply pressure line to first cylinder chamber 52, and the finger begins to close as soon as sufficient pressure builds to overcome both friction and the pressure exerted on the side of piston 42 facing second cylinder chamber 56. The 2-way valve exhausts air from second cylinder chamber 56 to the atmosphere, and is used to increase the speed of the finger.

There are physical delay characteristics and coupling between each pneumatic cylinder of each finger and each corresponding pair of solenoid controlled valves. Before a control signal is sent to switch a solenoid valve from off to on, one cylinder chamber is at a higher pressure than the other cylinder chamber is. When the control signal activates the solenoid valve, the pressure of the initially lower pressure side begins to increase while the pressure in the opposite cylinder chamber begins to decrease. No motion begins until the force exerted in the increasing pressure chamber overcomes the force generated by the pressure in the other chamber plus any static Coulomb friction present in the actuator.

The 2-way valve has an important function in the pneumatic circuit of the preferred embodiment of the present invention. Referring to FIG. 5, if this valve is removed, the flow from second cylinder chamber 56 must pass through only the servovalve (described more fully hereinafter), which does not have a large flow capacity. Thus, the pressure in second chamber 56 would decrease slowly and prevent rapid motion of the cylinder piston. The 2-way valve increases the discharge flow capabilities of the cylinder and provides the necessary fast closing action.

The 4-way solenoid valve is implemented in FIG. 5 in an unusual configuration. The ports used as inputs to the valve in the FIG. 5 embodiment of the invention are normally specified an output ports by the manufacturer. No adverse effects were observed by using the valves in this manner.

The finger of the robot hand never exceeds a velocity of about 30 inches per second. If the proximity sensors (described hereinafter as embodiments of the sensory means) used to detect the object are capable of operating at high velocities, then selection of a large solenoid valve would result in faster performance of the hand control. When the supply pressure (Ps) used with the pneumatic cylinders is between 40 and 120 psig, increasing the supply pressure does not result in a faster motion of the finger. Although the effect is small, decreasing the supply pressure will give a faster finger motion. This unexpected result comes from the smaller time required for the force balance of the two piston sides to change sign and initiate motion, and is dependent upon the physical coupling between the actuator and valve.

An independent pneumatic circuit, such as shown in FIGS. 1 and 5, is used to actuate each finger of the preferred embodiment robot hand of the present invention for several reasons. Solenoid valves are capable of large flow rates and are used when rapid motion is required. The power-to-weight ratio is much better than that of DC or step motors, and the compressible nature of the pressurized air gives the pneumatic system a natural compliance which aids in force control. The use of air removes any possibility of contamination in an otherwise clean environment. Pneumatic systems are available at a relatively low cost, and most industrial environments have a ready access to pressurized air supplies.

In accordance with the invention, the apparatus for controlling the robotic grasping of an object includes sensory means for sensing a point of close approach between the object and the contacting means. As embodied herein and shown for example in FIG. 6, the sensory means for sensing a point of close approach between the object and the contacting means includes a proximity sensor indicated generally at 62 and comprising a housing 64, at least one infrared light-emitting diode (LED) 66 for sending infrared light signals and at least one photodetector, such as a photodarlington 68, for receiving light signals which have been reflected from an object at a point in the acquisition envelope, which is between the two fingers of a robot hand. The photodetector generates an electrical signal upon receipt of infrared light emitted by LED 66 and reflected from the object. The magnitude of the electrical signal generated by the photodetector is in proportion to the intensity of the reflected infrared light reaching the photodetector.

Figure 6:
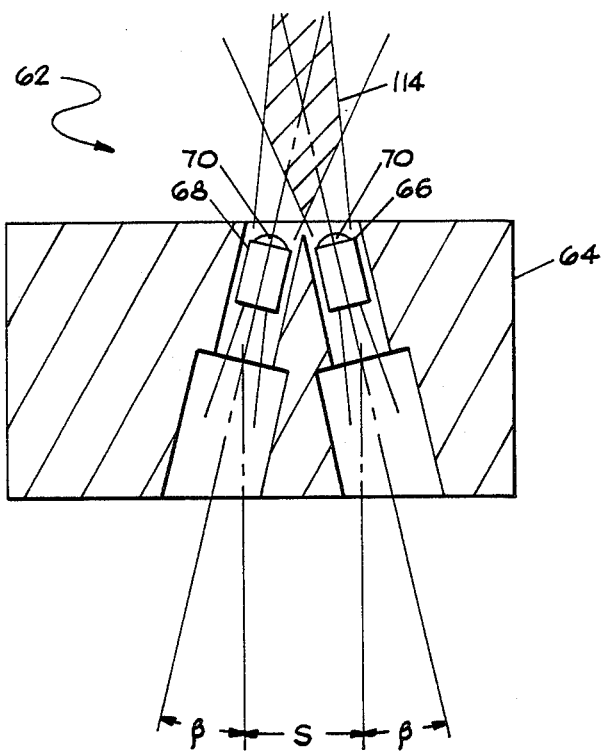
FIG. 6 is a schematic diagram of a proximity sensor of an embodiment of the present invention.

The proximity sensing device comprising the sensory means used in the preferred embodiment of the hand of the apparatus and method of the present invention and shown in FIG. 6 is mounted on the finger near the fingertip and requires essentially three elements: (1) the light-emitting diode (LED), (2) the photodarlington, and (3) the sensor housing. The LED and the photodarlington use diverging lenses 70, which are provided by the manufacturer and mounted as part of the LED and photodarlington housing. The path of light from the LED must intersect the incoming path to the photodarlington, but the margins for error are larger than for converging lenses, and accordingly the sensor housing is not as critical as it would be if converging lenses were used.

Figure 7:
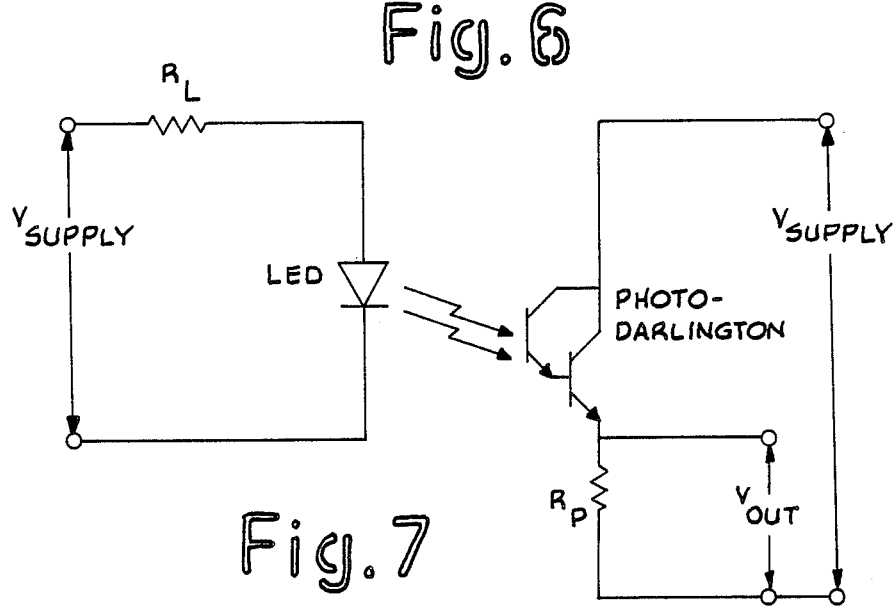
FIG. 7 shows a schematic diagram of a circuit for connecting a proximity sensor in accordance with an embodiment of the present invention.

The LED's used in the proximity sensors of the embodiment of the invention shown in FIG. 6 are Optron #OP 160, and the photodarlingtons are Optron #OP 530. The electrical arrangement for operating each sensor is shown in FIG. 7. The LED resistor $R_L$ is sized by the supply voltage and the maximum diode current. The photodarlington resistor $R_p$ is sized based on the desired maximum voltage output and the photodarlington current output. In the preferred embodiment of the invention, two proximity sensors were mounted at the free end of each finger, one at the top and one at the bottom of the free end of each finger. FIG. 4 shows the top mounted sensor, and the bottom mounted sensor is below the topmounted one and therefore obscured from view in the perspective shown in FIG. 4.

Referring to FIG. 6, two useful parameters for designing proximity sensors are the orientation angle "B" and the separation distance "S". Selection of an appropriate sensor design requires comparing the outputs of voltage versus proximity distance for different sensed materials and different sensor designs. The design configuration for the sensors used in the preferred embodiment of the present invention has b=15° and S=0.35 inches. This sensor design was selected for the hand of the preferred embodiment of the invention, because it had a peak signal level at the largest proximity sensing distance of the tested design configurations.

Figure 8:
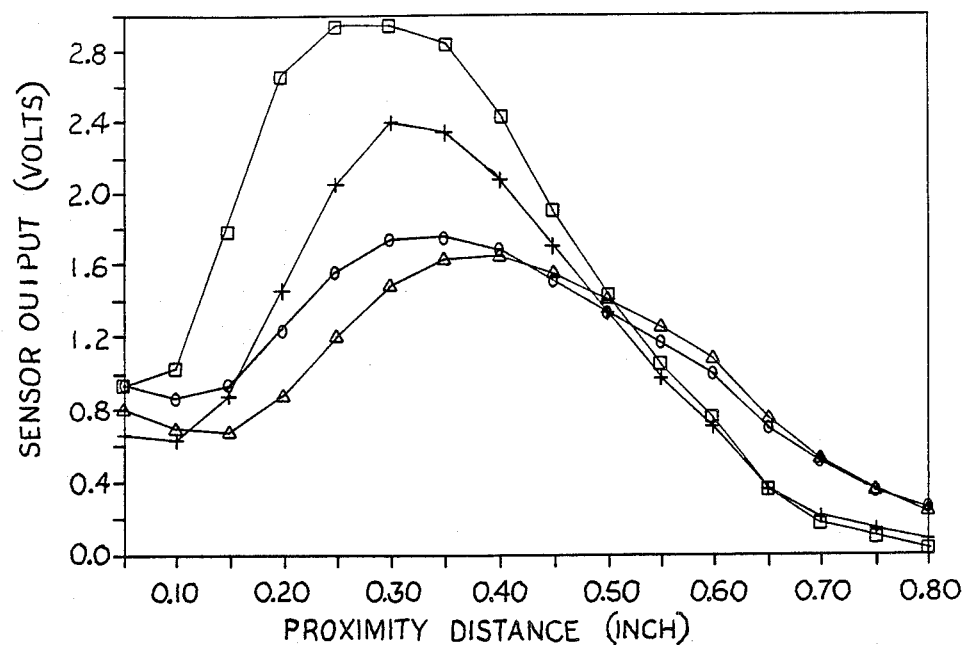
FIG. 8 is a graph of the output signals of a number of proximity sensors, including one used in an embodiment of the present invention, for the same object.
Figure 9:
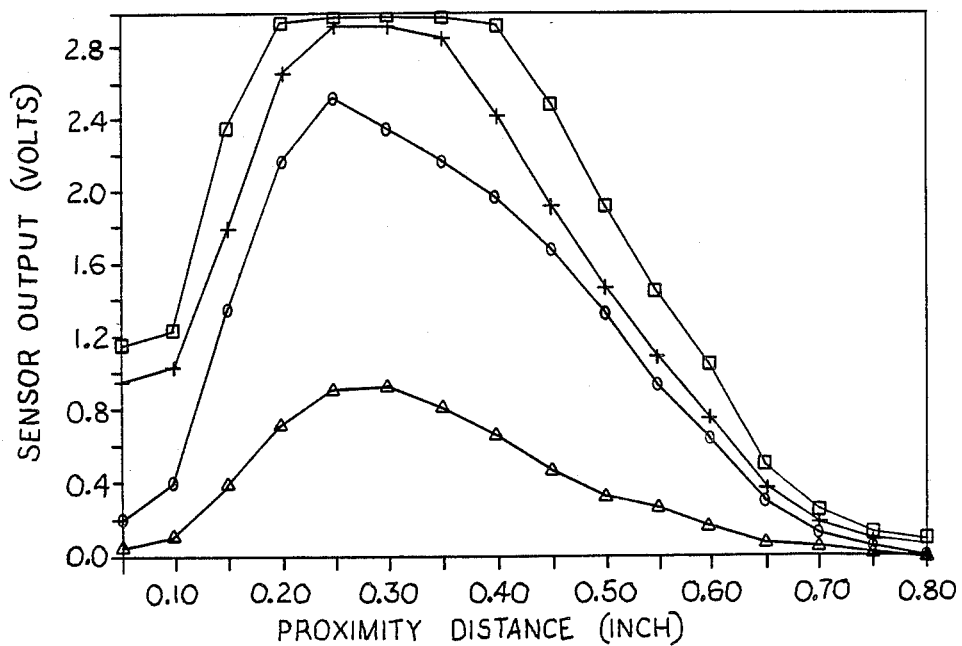
FIG. 9 is a graph of the output signals of an embodiment of a proximity sensor of the invention for four different objects.

Four different sensors of the selected design configuration were constructed and used at different times on the preferred embodiment of the robot hand of the present invention. For each of the tested sensors, FIG. 8 shows the sensor (photodarlington) output voltage versus proximity distance to the same object. FIG. 9 shows the output of the design proximity sensor of the preferred embodiment of the present invention for a variety of objects.

Photoelectric proximity sensors are preferred for embodiments of the robot hand of the present invention for several reasons. Photoelectric proximity sensors are low in cost, easily adjusted for varying conditions, easily interfaced with a computer, and work well with a wide range of materials. The output of a photoelectric proximity sensor depends not only on the distance to a sensed object, but also on the surface reflectivity of the object. The latter dependence can present a problem that can be partially overcome by accepting sub-optimal performance from the robot hand analog control circuit (described hereinafter). The sensitivity of the photoelectric proximity sensors to ambient light levels, can be overcome by appropriate sensor calibration.

In accordance with the invention, the apparatus for controlling the grasping of an object includes means for braking said first velocity to a second velocity in the first direction. For example, as embodied herein and shown in FIG. 1, the means for braking said first velocity to a second velocity in the first direction includes a proportional pneumatic servovalve 58, an analog control circuit 72, and a robot hand control means 74.

When a finger or other contacting means nears the object and the proximity sensor generates a proximity signal. i.e., a signal indicating that the contacting means has reached a point of close approach to the object, analog control circuit 72 receives the proximity signal from the proximity sensor and switches the solenoid valves back to their normally "off" state. Accordingly, both sides of the cylinder are again under servovalve control as shown in FIG. 1. The signal generated by the sensory means is received not only by analog control circuit 72, but also by a robot hand control means 74[When the robot hand control means receives the signal from proximity sensor 62 indicating that the contacting means has reached a point of close approach to the object, robot hand control means 74 activates servovalve 58 to apply a maximum pressure differential across piston 42 of cylinder 40. Because of the greatly reduced flow area of servovalve 58 versus solenoid valves 8, 50, the sudden switch from solenoid valve on mode operation to servovalve operation in pressure supply circuit 44 greatly reduces the pressure differential across piston 42 and accordingly brakes the velocity of the contacting means in the direction approaching the object. Thus, the rapid velocity of the contacting means during actuation of the contacting means while the supply circuit is operating through solenoid valves 48, 50 is braked to a such lower second velocity attributable to operation of the pneumatic supply circuit with the solenoid valves operating in the off mode and the servovalve controlling the supply of pressure to cylinder 40.

Figure 10:
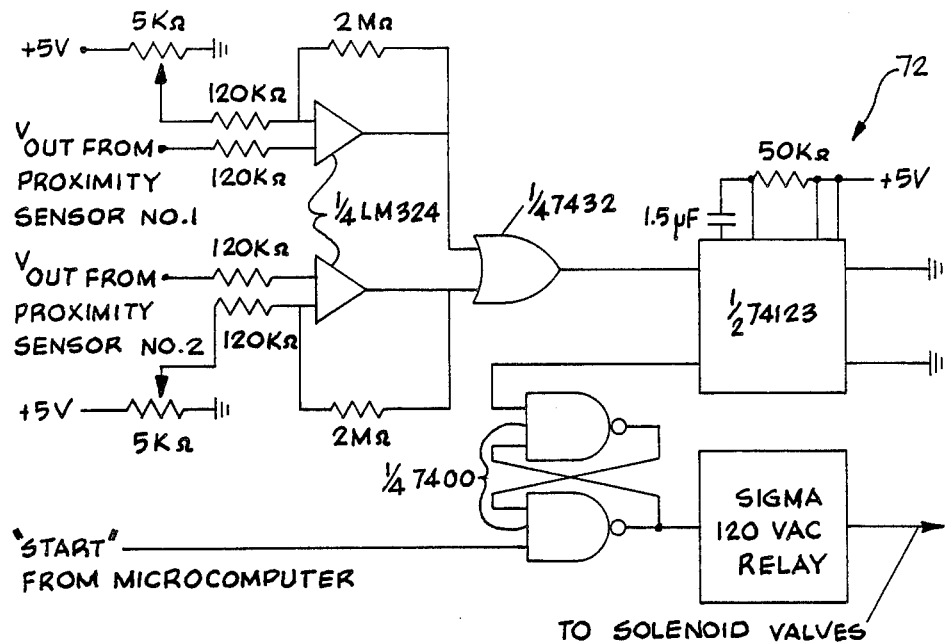
FIG. 10 is a schematic diagram of an embodiment of an analog control circuit for bi-modal control of one robot finger in accordance with an embodiment of the invention.

A schematic for an analog control circuit 72, which implements the "bi-modal" control i.e, on/off valve control in one mode and servovalve control in a second mode, for a single finger, is given in FIG. 10. This circuit contains six basic parts: (1) a set of two potentiometers for setting proximity sensor thresholds, (2) an LM324 quad operational amplifier which implements the proximity sensor threshold comparison, (3) an LM7432 quad "OR" gate for combining the outputs of each finger's two proximity sensors, (4) a Sigma 120 volt AC relay for the solenoid valves, (5) a 7400 "NAND38 gate which implements a latch for the solenoid relays, and (6) a 74123 dual retriggerable monostable multivibrator for strobing the "NAND" gate latch.

Figure 11:
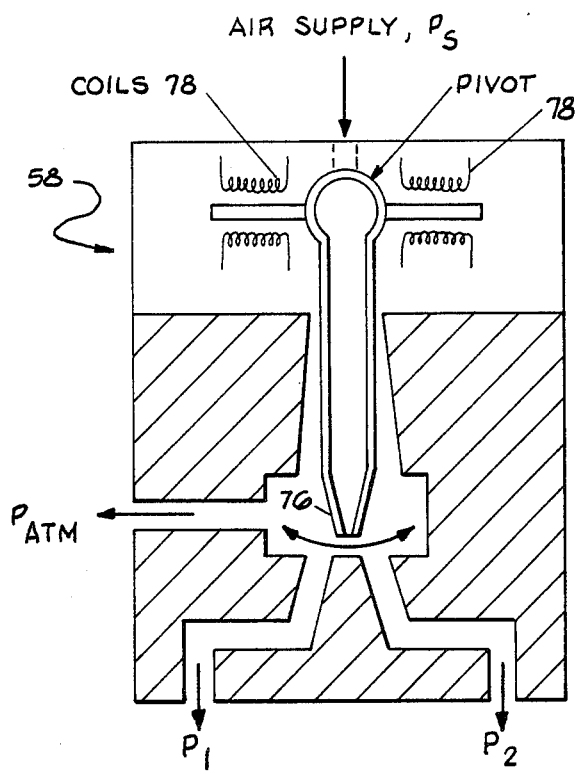
FIG. 11 is a schematic diagram of a proportional pneumatic jet-pipe servovalve used in an embodiment of the invention.
Figure 12:
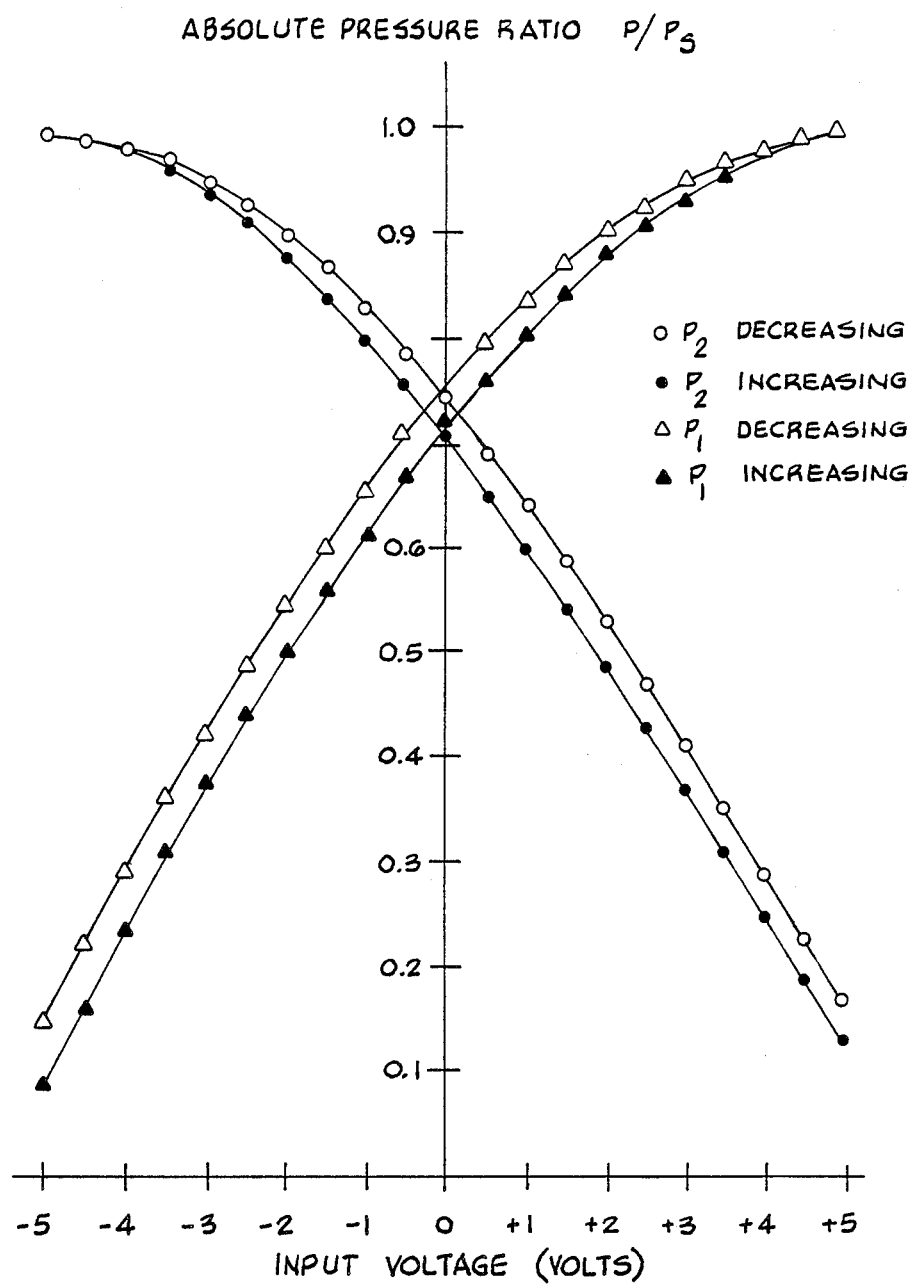
FIG. 12 is a graph of pneumatic servovalve absolute pressure ratio versus servovalve input voltage.

A pneumatic jet-pipe servovalve 58, such as an Atchley Controls Model #100, was used in the preferred embodiment of the robot hand grasping control apparatus and method of the present invention. FIG. 11 shows a schematic diagram of this pneumatic servovalve, which acts as an active modulated transducer with a constant input air supply pressure $P_s$, a modulating electrical current, and two pneumatic outputs, $P_1$ and $P_2$. Although servovalves are generally considered flow sources, the pneumatic servovalve acts much more like a pressure source, since two pressure outputs depend upon the supply pressure $P_s$ and the position of a jet pipe 76, which is co by electromagnetic coils 78. The coil approximately constant, resulting in a coil current to the applied voltage. A steadystate static relationship between the input voltage and two resulting pressures, $P_1$, $P_2$, was determined by and is given in FIG. 12. The two curves of input voltage and output pressure ratio were determined by averaging the results at supply pressures ($P_s$) 65, 80, and 95 psia.

Figure 13:
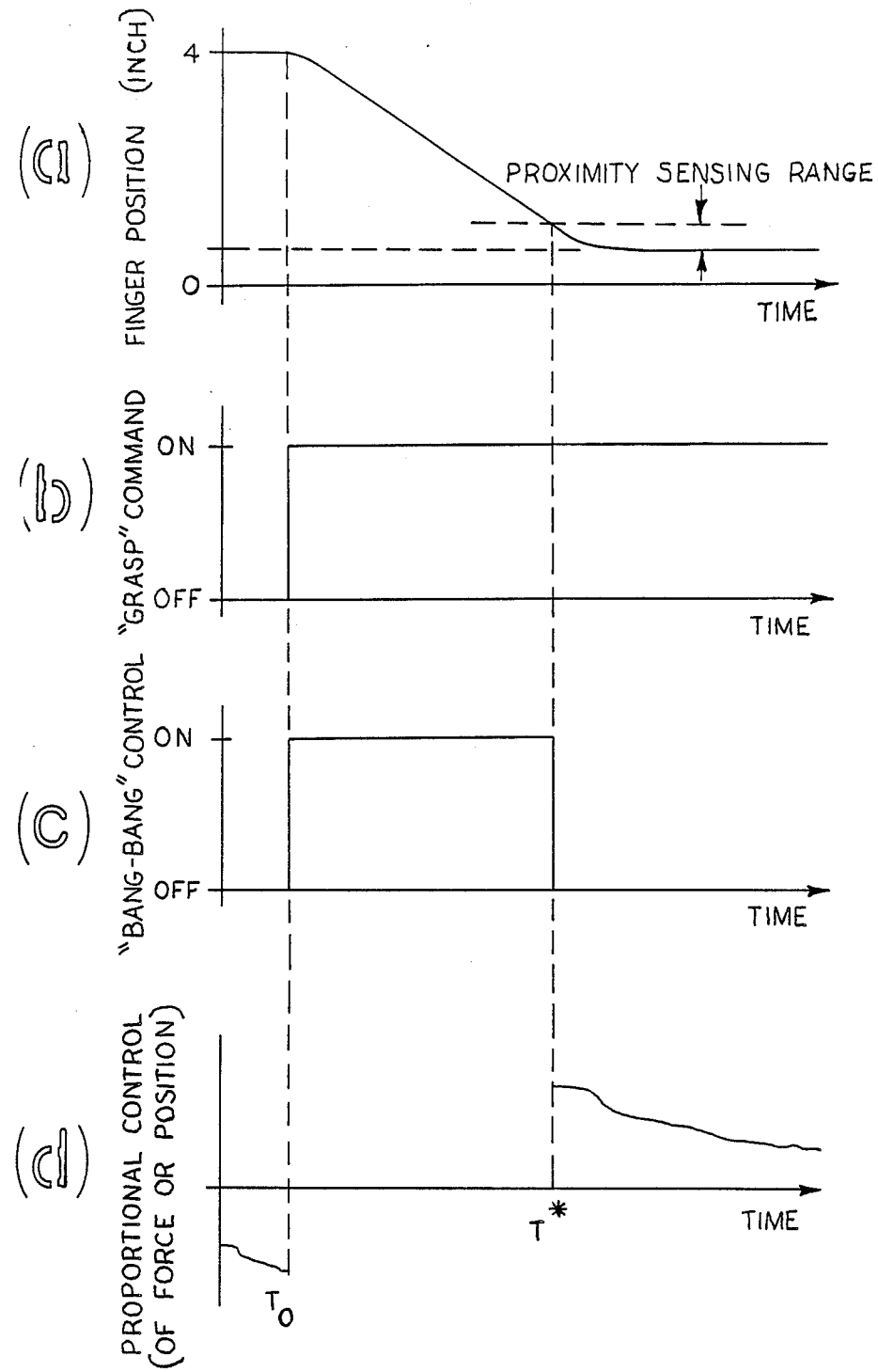
FIG. 13 shows a sequential timing diagram for the operation of an embodiment of a finger according to the present invention.

A timing diagram for the operation of one finger is FIGS. 13. The relays and solenoid valves are "off" with the output of the relay at 0 volts. A high-to-low transition on the "Start" line from a computer constituting the robot hand controller (described hereinafter) will switch the relays to the state (120 volts AC). This "Start" signal will n return to a high level, but the latching of "NAND" gates will keep the relays on until the means indicates a point of close approach between an object and the contacting means.

Referring to FIG. 10, the output of each of the two proximity sensors on a finger is compared to an adjustable threshold level signal by the operational amplifiers o control circuit 72. When the output of any promixity sensor is greater than its calibrated output, the output of the LM324 switches from (zero volts) to high (3.5 to 4 volts). The outputs o each pair of proximity sensor comparators are routed t "OR" gate which delivers a high output if either of its inputs go high. This arrangement a the solenoid valve switch from on to off to occur if either of the proximity sensors mounted on a single finger detects an object. The output of the "OR" chip is sent to the monostable multivibrator which outputs a high-to-low pulse when its input goes high. This high-to-low pulse will set the network of "NAND" gates back to a low state, which turns the relay off and switches the system back to servovalve control. The monostable multivibrator was added to the circuit to prevent oscillations in the "NAND" gate network when the "Start" signal was not pulsed correctly. The analog control circuit of FIG. 10 implements the "bi-modal" control strategy with a small amount of electronic hardware. The only problems encountered in use have been occasional line voltage transients triggering one of the relays without any signal from the computer. This problem could be solved by adding optoisolators between the "NAND" gate output and the relays.

In accordance with the invention, the apparatus for controlling the robotic gripping of an object includes means for controlling the touch force between the contacting means and the object. As mentioned above, the touch force is the static force between the contacting means of the robot hand and the object, and this is the force between the contacting means and the object when the velocity of the contacting means relative to the object is zero. For example, as embodied herein and shown schematically in FIG. 1, the means for controlling the touch force between the contacting means and the object includes an impact sensing means 80 and a robot hand control means 74 having memory means storing a first threshold level force signal.

In accordance with the invention, there is provided means for sensing the impact between the contacting means and the object. For example, as embodied herein and shown in FIG. 4, the means for sensing the impact between the contacting means and the object comprises at least one strain gage 82 mounted near the free end of the contacting means. As shown in FIG. 4, strain gages are mounted at two sites on a closing surface 36, i.e., a surface facing the object to be grasped and the acquisition envelope of the hand, of each finger. The closing surface mounted pair of strain gages measures the touch force between a finger and the object. The strain gage sends a signal to the robot hand control means that is proportional to the touch force between the finger and the object.

The strain gages produce low electrical signals, which can be protected against unwanted noise by the addition of appropriate design features, as known in the art. In an alternative embodiment of the impact sensing means shown for example in FIG. 1, a microswitch 84 is mounted on a closing surface of a finger such that activation of microswitch 84 occurs upon application of a predetermined force level to microswitch 84. In the activated mode, microswitch 84 sends a output signal to the robot hand control means when finger 32 is applying the predetermined force level to the object. The microswitch is essentially an on/off impact sensor, while the strain gage embodiment is a proportional sensor.

In accordance with the invention, there is provided a robot hand control means having memory means storing a first threshold level force signal. For example, as embodied herein and shown in FIG. 14, the robot hand control means having memory means comprises a programmable electronic microcomputer 86 having two accessory interface boards 88, 90.

Programmable electronic microcomputer 86 receives inputs from proximity sensor 62 and the impact sensing means and controls the actuation of the servovalve to equilibrate the chambers of pneumatic cylinder 40 and thus stop movement of finger 32.

A Motorola EXORCISER II microcomputer development system was chosen as the robot hand control means of the preferred embodiment of the present invention. This microcomputer uses a Motorola M6800 microprocessor with a system clock speed of 1 Mhz. A microcomputer was used for controlling the hand, since different control strategies could be implemented by changing software programs. For example, microcomputer 86 has the capability to receive and analyze additional data, such as output signals from finger position sensing means. The 6800 microprocessor chip uses an 8 bit data and control bus. This particular microcomputer system was selected over other 8 bit systems because of availability and the capability of programming in the MPL language.

As each finger moves toward the object at the second velocity, which is much reduced from the first velocity, microcomputer 86 monitors the impact sensors of each finger. When microcomputer 86 receives a force output signal from an impact sensor, microcomputer 86 controls servovalve 58 to apply equilibrating pressures to the two chambers of cylinder 40 such that the net force on piston 42 is zero. Accordingly, piston 42, rod 54 and finger 32 attached thereto come to rest.

Microcomputer 86 can be programmed to respond to either a minimal signal level from an impact sensor or another preprogrammed force signal level from an impact sensor. Thus, a finger can be brought to a halt as it applies a touch force equal to a predetermined force level with which the microcomputer has been preprogrammed.

Figure 15:
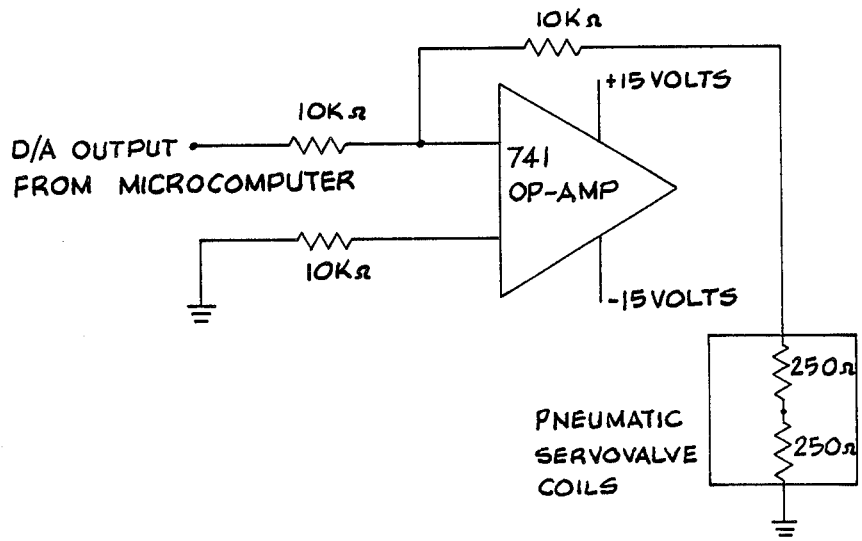
FIG. 15 illustrates an embodiment of an interface between a digital/analog amplifier output and a pneumatic servovalve according to an embodiment of the present invention.

Two accessory interface boards were added to the base computer system for use with the robot hand of the preferred embodiment of the present invention. As shown in block diagram format in FIG. 14, an Analog Devices #AD-1231 board 88 provides 16 channels of analog to digital (A/D) output and 2 channels of digital to analog (D/A) input. The A/D channels are used for reading the force and proximity sensor outputs. The D/A channels are used to drive the operational amplifiers connected to the pneumatic servovalve of each finger, as shown in FIG. 15. A second interface board 90 uses a Motorola M6821 Interface Adapter (PIA) chip and was fabricated by Engineering Services at Clemson University. This PIA board provided 8 channels of digital input/output (I/O), which was used for communicating with the robot arm control computer, a Digital Equipment Corporation PDP-11/03.

Figure 14:
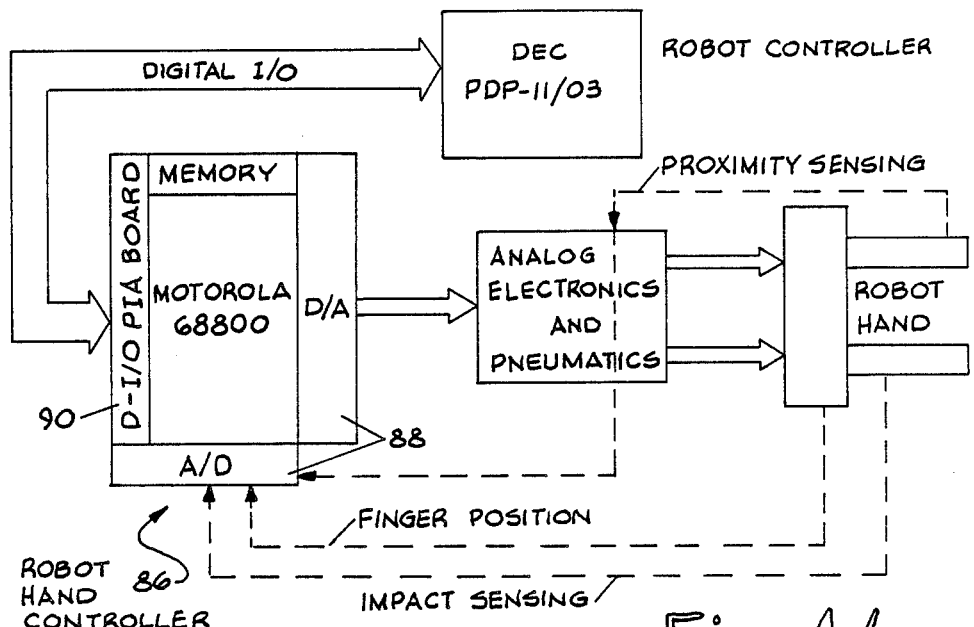
FIG. 14 is a schematic diagram of a microcomputer control system according to an embodiment of the invention.

The relatively slow clock speed of 1 Mhz used by the M6800 microprocessor caused limitations in the maximum available sampling time, when the hand control programs (listed hereinafter) were executed. As shown in FIG. 14, the position and force control loops for the robot hand are closed through the microcomputer, while the proximity loop is not. This arrangement was selected to minimize the delay time from receiving the proximity signal, until the switch of the "bi-modal" control system from the solenoid valves to the servovalve occurred. The current solution to these limitations is to use proportional control algorithms and integer arithmetic, which can be implemented with a minimum of computer code. More complicated control algorithms could improve the performance of the hand, but a faster microprocessor would be necessary for real-time control.

Computer Program Description and Listings

The computer programs used to control the robot hand of the preferred embodiment of the present invention are divided into two groups: (1) programs for the Motorola 6800 microcomputer which directly controls the robot hand, and (2) supervisory programs for controlling the robot arm during the demonstrations. A description of each hand control program's purpose will be followed by the program listings.

Robot Hand Control Software

All control programs used on the Motorola EXORCISER microcomputer are written in the language Motorola Programming Language (MPL) which has a syntax similar to the mainframe language PL/I. This language is higher level than assembly or machine language, but not as high level as FORTRAN or PASCAL. This language was selected because the editor and error message facilities allow low level code useful for control algorithms to be written much faster than by using assembly language.

The MPL control program is divided into three parts: (1) main program, (2) major procedures (subroutines), and (3) minor procedures. This structure for the program allows individual procedures to be changed and the program segments linked without requiring the entire program to be re-compiled each rime.

The main MPL program is named HAND and a listing is given below. The main program performs the following activities: (1) initializes all variables used in the main program and all variable values passed to the procedures (lines 200-810), (2) reads in variable values from the terminal at program initialization (lines 820-1330), (3) communicates with the robot control computer through the variables DATA and DATB (lines 1340-1550, 1620, 1640, 1660, 1700-1720), and (4) selects appropriate major procedure (LOCATE, GRASP, or CENTER) based on information received from the robot computer (lines 1550-1790).

The major procedure LOCATE is used to find the center of the object in the radial direction of the robot arm. This procedure is called from the main program HAND and performs the following tasks: (1) initiates approach of robot hand toward object by sending value $81 (hexadecimal 81 or decimal 129) to robot arm computer (line 260), (2) monitors a "break-beam" sensor (not shown) to determine when an object is encountered (lines 290-350) and records radial position of arm when the object breaks the beam (lines 380-420), (3) continues monitoring "break-beam" sensor to find opposite side of the object (=lines 450-500), (4) when opposite side is found, sends signal ($82) to robot telling it to move back to center of object (line 550), (5) sends signal to robot to stop ($0) when the radial position matches the halfway .point between the two "break-beam" points (lines 570-700), and (6) control returns to the main program HAND.

Procedure GRASP is used to grasp the object with the hand and is called from the main program after the object has been found by LOCATE. The GRASP procedure does the following: (1) monitors proximity sensor outputs for both fingers and gets appropriate servovalve pressure levels when a proximity threshold is crossed (lines 350-710), (2) monitors the grasping force sensors on both fingers and checks for either one rising above a preset threshold which indicates contact with the object (lines 760-840), (3) when the first finger contacts, it is commanded to maintain its current position while the other finger continues closing until its force sensor rises above the threshold (lines 860-1230), (4) now that both fingers have made contact, the left finger is commanded to maintain its position while the right finger is commanded to maintain the commanded grasping force level (lines 1290-1500), (5) the robot control computer is informed that the hand has grasped the object so that it can be moved (line 1540), and (6) the procedure continues to perform step #3 until the robot hand commands either executing the CENTER procedure or releasing the object (line 1580). The control strategy given in step #4 was selected in one embodiment of the invention because the right finger of this embodiment of the invention had a more sensitive touch force sensor due to the particular hardware used, and this strategy resulted in better force control for this particular embodiment.

Four minor procedures are used by the main program as well as the three major procedures. Listings for the minor procedures and the task performed by each are discussed below: (1) ADREAD—reads a specified A/D (analog to digital) channel and returns the result as a signed 16 bit value, (2) DASET—sets the output of one of the two D/A (digital to analog) converters, (3) QUIT—determines if any key has been pressed on the keyboard, and returns control to the operating system if a key has been pressed, and (4) RDVAL—reads a signed 16 bit value from the keyboard.

In accordance with the invention, the method of controlling the grasping or an object located within the acquisition envelope of a robot hand having a means for contacting the object comprises imparting a first velocity to the contacting means in a first direction; sensing a point of close approach between the contacting means and the object; braking said first velocity to a second velocity; and controlling the touch force of the contacting means with the object.

In accordance with the present invention, there is provided the step of imparting a first velocity to the contacting means in a first direction. As embodied herein, the step of imparting a first velocity to the contacting means in a first direction includes actuating a pneumatic cylinder 40 having a piston 42 and piston rod 54 attached to a robot hand finger 32. As shown in FIGS. 2 and 3, each robot finger is attached to one end of a piston rod 54, which forms s part of pneumatic cylinder. A first chamber and a second chamber of cylinder 40 are separated by a piston 42 at the end of piston rod 54 opposite the and attached to finger 32.

For purposes of the following discussion, a reference to plugged 4-way solenoid valve of FIG. 5 is equally applicable to a reference to 3-way solenoid valve of FIG. 1. As shown in FIGS. 1 and 5, a supply pressure line 92 has a first branch supply line 94 and a second branch supply line 96. First branch supply line 94 is connected to one of four input ports 98 of 3-way solenoid valve 50, and second branch supply line 96 is connected to an input port 100 of proportional servovalve 58. A first cylinder line !02 is connected at one end to first chamber 5 of pneumatic cylinder 40, and first chamber 52 partially encloses piston rod 54. First cylinder line 102 has a second end connected to an output port 104 of 3-way solenoid valve 50. An intermediate line 106 is connected at one end to a first output port of servovalve 58 and at the other end to another input port 98 of 3-way solenoid valve 50. A second cylinder line 108 disconnected at one end to second chamber 56 of pneumatic cylinder 40 and has a first branch cylinder line 11 connected to an input port of 2-way solenoid valve 48. Second cylinder line 108 has a second branch cylinder line 112 connected to a second output port of servovalve 58.

As shown in FIGS. 1 and 5, pneumatic cylinder 40 is pressurized by pneumatic jet-pipe servovalve 58. Imparting a first velocity to the contacting means, finger 32 for example, in a first direction, requires applying a net force to cylinder piston 42 from either first chamber 52 or second chamber 56. This is accomplished by instantaneously switching 2-way solenoid valve 48 simultaneously with 4-way solenoid valve 46 (FIG. 5). Schematically speaking with regard to FIG. 5, the simultaneous and instantaneous switching from servovalve control to solenoid valve control corresponds to moving each of the solenoid valves to the right in FIG. 5 so that the lefthand schematic solenoid valve chamber moves into a position to connect first branch supply line 94 with first cylinder line 102 in the case of 4-way solenoid valve and to permit second cylinder line 108 to vent to atmosphere through first branch cylinder line 110 and 2-way solenoid valve 48. As this transfer of control over the pneumatic circuit for pneumatic cylinder 40 occurs, the pressure inside second chamber 56 of pneumatic cylinder 40 decreases drastically relative to the pressure inside first chamber 52 of pneumatic cylinder 40, and accordingly cylinder piston 42, piston rod 54, and finger 32 of one or more of FIGS. 2, 3 and 5 move rapidly from left to right in the respective FIGS. In operation, the instantaneous pressure changes in pneumatic cylinder 40 causes a brief but large acceleration of finger 32, until a maximum velocity is shortly, i.e., almost instantaneously, achieved and maintained.

In accordance with the present invention, there is provided the step on sensing a point of close approach between the contacting means and the object. For example, as embodied her--in and shown in FIG. 1, at least one proximity sensing device, also called a proximity sensor and the like, such as the combination illustrated in FIG. 6 of an infrared light-emitting diode, a photodarlington and a housing, is mounted near the free end of a robot hand finger, or other embodiment of the contacting means of the present invention. When the object enters a sensing volume 114, which is indicated by the crosshatched shading in FIG. 6, photodarlington 68 detects infrared light which has been emitted from LED 66 and reflected off a surface of the object. Photodarlington 68 generates an output signal proportional to the intensity of the detected infrared light. As shown for example in FIG. 10, the output signal of the photodarlington is compared in an analog control circuit, to a threshold value which can be preset by varying a potentiometer, also shown in FIG. 10. Accordingly, finger 32 eventually reaches a so-called point of close approach when the object is close enough to finger 32 such that the output signal of photodarlington 68 reaches the preset threshold value signal.

FIG. 1 shows a schematic of the "bi-modal" control system implements on one finger of the hand, while an identical system is used to control a second independent finger. The robotic grasping operation normally requires at least two opposed fingers surrounding and closing upon the object to be grasped. The apparatus of the present invention for controlling the grasping of an object and the method therefor operates essentially identically for each of the two fingers comprising a robot hand. However, in one embodiment of the invention comprising two fingers under the control of a single robot hand control means, it is important for the hand control means to recognize which of the two fingers will be the first finger to contact the object in a situation in which the object is not positioned equidistantly from each of the two fingers. Thus, the hand control means monitors the transmission of the first activation signal generated by the analog circuit control means and sent to the solenoid valves to activate them into their off mode, because the first transmission of this signal indicates that the corresponding finger has become the first finger to reach the point of close approach and thus will become the first finger to contact the object. The hand control means monitors the impact sensor of that finger which the control means has identified as the first finger to strike the object, for any output signal indicating the slightest contact between such finger and the object. Upon receipt of the awaited impact sensor signal from the impact sensor of the designated first finger, the hand control means sends a signal to the servovalve to equilibrate the forces between chambers 52, 56 of pneumatic cylinder 40 to stop further movement of piston 42, and correspondingly of finger 32. The hand control means has been preprogrammed with the grasping force, i.e., the maximum touch force to be applied to the object during the grasping operation. Hand control means 74 monitors the impact sensor of the second finger to strike the object for a signal corresponding to the minimum force signal level. Upon receipt of this second minimum force signal, hand control means 74 position controls the first finger to maintain its position. The manner in which this position control is accomplished is known in the art. Concurrently, the hand control means controls the second finger to attain the preprogrammed touch force by adjusting the servovalve control current according to the force signal being received from the impact sensor of the second finger. Thus, the first finger will not strike the object with sufficient force to displace the object toward the second finger to strike the object, and the second finger is used to apply sufficient force to grasp the object firmly between the fingers without damaging the object in question.

In accordance with the method of the present invention, there is provided the step of braking said first velocity to a second velocity. For example, as embodied herein, the method of braking the first velo-velocity to a second velocity includes the substeps of (1) using an analog control circuit to compare the signals received from the sensory means with a threshold level reference signal and (2) when a signal received from the sensory means equals or exceeds the threshold reference signal, switching from solenoid valve control to servovalve control. As embodied herein and shown for example in FIGS. 1, 5 and 10, an activation output signal generated in analog control circuit, which is generally indicated as 72 in FIG. 10, is directed to the two solenoid valves, which are switched over to the configuration shown in FIG. 1. Upon switching of solenoid valves 48, 50 in accordance with the activation signal generated by the analog control circuit, the servovalve orifices, which are significantly smaller than the air flow paths provided in solenoid valves 48, 50, essentially equilibrate the pressures on each side of cylinder piston 42 and accordingly a braking force is suddenly applied to each of cylinder piston 42, piston rod 54 and finger 32 connected thereto. In other words, pneumatic jet-pipe servovalve 58 applies essentially equilibrating supply pressure to both sides, i.e., both first chamber 52 and second chamber 56, of cylinder 40 such that the constant velocity in the first direction (the left-to-right direction in the example of FIG. 5) that has been attained by piston 42, piston rod 54 and attached finger 32 is decelerated. The reduced pressure difference being applied across piston 42 while the supply pressure of supply pressure line 92 is applied through servovalve 58 results in a great reduction in the first velocity of the contacting means and the attainment of a much lower second velocity.

Upon generation of the activation output signal from analog control circuit 72 to the solenoid valves, a hand control means (described above) controls the pneumatic jet-pipe servovalve to introduce the largest pressure difference across servovalve 58 as possible in order to continue movement of finger 32 in the first direction, i.e., left-to-right as seen in FIG. 5, as rapidly as possible, allowing for the constraints of the reduced flow area of servovalve 58 relative to the solenoid valves. This constant pressure difference produces movement of finger 32 in the first direction, i.e., left-to-right in FIG. 5, at a substantially constant second velocity, which is significantly less than the first velocity attained when the two chambers of cylinder 40 were connected to the solenoid valves.

In a further embodiment, when the analog control circuit sends an activation signal to the solenoid valves such that the solenoid valves are switched to the off mode and the servovalve controls the pressure applied across piston 42, the activation signal is also received by a robot hand control means, which then responds to the activation signal by controlling the servovalve such that servovalve 58 supplies the maximum pressure difference across pneumatic cylinder piston 42 that servovalve 58 is capable of supplying. In a still further embodiment of the invention, instead of being directed to solenoid valves 48, 50, the activation signal of analog control circuit 72 can be directed to a programmable robot hand control means 74 for further processing before any activation signal is sent to solenoid valves 48, 50.

In accordance with the method of the invention, there is provided the step of controlling the touch force between the contacting means and the object. As embodied herein and illustrated for example in FIGS. 1 and 14, the step of controlling the touch force between the contacting means and the object includes the step of receiving an output signal from an impact sensor of the contacting means and sending a signal to servovalve 58 such that the servovalve supplies appropriate pressures to the two chambers of pneumatic cylinder 40 and stops movement of the cylinder piston and corresponding finger. If the finger in question is the first finger to contact the object, and grasping of the object is to be effected with a strategy calling for the first finger to be position-controlled and the second finger to be forcecontrolled, i.e., position/force grasping control, then the predetermined threshold value can be preset for the minimum force sensitivity of the impact sensing means. In this case, i.e., the position/force case, output force signals received by the hand control means, which signals come from the second finger to contact the object, will be compared to a preprogrammed signal level corresponding to the predetermined grasping force.

After the switchover from the supply pressure being routed through the solenoid valves to the pressure being routed through the servovalve and the subsequent signal being sent to servovalve 58 for supplying the maximum pressure difference across pneumatic cylinder piston 42 to effect movement of the contacting means at a second velocity in the first direction significantly less than the first velocity in the first direction, robot hand control means monitors the output signal from impact sensing means 80, which is mounted near the free end of finger 32. Upon receipt of an impact sensor output corresponding to a predetermined touch force, hand control means 74 sends a signal to servovalve 58 such that the servovalve supplies equilibrating pressures to the two chambers of pneumatic cylinder 40 and stops movement of piston 42 and corresponding finger 32.

Accordingly, the pneumatic cylinders which actuate each contacting means of the robot hand embodiment of the present invention are controlled by a combination of pneumatic solenoid (on/off) valves and a servovalve. The novel combination of the characteristics of both a pneumatic servovalve and solenoid valves is used to control the preferred embodiment of the robot hand of the present invention. The "bi-modal" strategy of the present invention uses the strengths of the two types of pneumatic valves without many of their corresponding deficiencies. The purpose of the solenoid valves is to supply a large flow of air to the cylinder during the initial closing motion of the fingers to provide fast closing velocities. The pneumatic servovalve can be used for proportional control of pressure once the finger is near the object. The switching of the solenoid valves from the "on" state to the "off" state is controlled by an analog control circuit means in accordance with information supplied by proximity sensors, and low object touch forces are attained by a microcomputer robot hand control means controlling a servovalve in accordance with information supplied by impact sensors in the fingers, even when the exact location of the object relative to the finger is not known by the control means prior to the initiation of the robot hand grasping operation.

It will be apparent to those skilled in the art that various modifications and variations can be made in the apparatus and method for controlling the robotic grasping of an object located within the acquisition envelope of a robot hand having a means for contacting the object, without departing from the scope or spirit of the invention. Thus, it is intended that the present invention cover the modifications and variations of this invention provided these modifications and variations come within the scope of the appended claims and their equivalents.

```
            MAIN PROGRAM
0010   /*      MAIN PROGRAM HAND
0020      PROGRAM     INTERFACES HAND WITH ROBOT
0030        ^  THIS PROGRAM WAITS FOR SIGNAL TO CLOSE HAND
0040           AS WELL AS CORRECT VALUE FOR FORCE
0050
0060           A/D CHANNELS :
0070              0  -  POSITION OF LEFT FINGER
0080              1  -  FORCE SENSOR FOR LEFT FINGER
0090              2  -  FORCE SENSOR FOR RIGHT FINGER
0100              3  -  NOT USED
0110              4  -  POSITION OF RIGHT FINGER
0120              5  -  BREAK BEAM OUTPUT
0130              6  -  LEFT FINGER PROXIMITY OUTPUT
0140              7  -  RIGHT FINGER PROXIMITY OUTPUT
```

```
0150             8 - WEIGHT SENSORS  (USES GAGE PROCEDURE)
0160             9 - ROBOT'S RADIUS OUTPUT
0170            10 - 15  NOT USED
0180 */
0190
0200 HAND: PROC OPTS(MAIN)
0210      DCL I, DAUN1, DAUN2
0220      DCL VALUE0 SIGNED BIN(2), VALUE1 SIGNED BIN(2)
0230      DCL VALUE2 SIGNED BIN(2), VALUE3 SIGNED BIN(2)
0240      DCL THRESH  SIGNED BIN(2)
0250      DCL STR0 CHAR(18) INIT('ENTER CALIBRATION ')
0260      DCL STR02 CHAR(18) INIT('- A/D UNITS PER LB')
0270      DCL CR0 BIN INIT($0D), LF0 BIN INIT($0A)
0280      DCL STR1 CHAR(18) INIT('ENTER THRESHOLD - ')
0290      DCL CR1 BIN(2) INIT($0D0A)
0300      DCL STR2 CHAR(20) INIT('ENTER BREAK VALUE - ')
0310      DCL CR2 BIN(2) INIT($0D0A)
0320      DCL STR3 CHAR(22) INIT('ENTER FINGER OFFSET - ')
0330      DCL CR3 BIN(2) INIT($0D0A)
0340      DCL STR4 CHAR(13) INIT('ENTER LCONS -')
0350      DCL CR4 BIN(2) INIT($0D0A)
0360      DCL STR5 CHAR(13) INIT('ENTER RCONS -')
0370      DCL CR5 BIN(2) INIT($0D0A)
0380      DCL STR9 CHAR(21) INIT('ZERO1 AND ZERO2 ARE: ')
0390      DCL Z1 CHAR(10),  Z2 CHAR(10)
0400      DCL CR9 BIN(2) INIT($0D0A)
0410
0420      DCL DATA BIN DEFINED $E020
0430      DCL DATB BIN DEFINED $E022
0440      DCL CNTRLA BIN DEFINED $E021
0450      DCL CNTRLB BIN DEFINED $E023
0460      DCL SWICHL  SIGNED BIN(2) DEFINED $B000
0470      DCL SWICHR  SIGNED BIN(2) DEFINED $B002
0480      DCL CONTRL  SIGNED BIN(2) DEFINED $B004
0490      DCL LPOS    SIGNED BIN(2) DEFINED $B006
0500      DCL RPOS    SIGNED BIN(2) DEFINED $B008
0500      DCL RPOS    SIGNED BIN(2) DEFINED $B008
0510      DCL SWITCH  SIGNED BIN(2) DEFINED $B00A
0520      DCL OFFSET  SIGNED BIN(2) DEFINED $B00C
0530      DCL CALIB   SIGNED BIN(2) DEFINED $B00E
0540      DCL ZERO1   SIGNED BIN(2) DEFINED $B010
0550      DCL ZERO2   SIGNED BIN(2) DEFINED $B012
0560      DCL LCONS   SIGNED BIN(2) DEFINED $B014
0570      DCL RCONS   SIGNED BIN(2) DEFINED $B016
0580
0590 /*        OPEN FINGERS                              */
0600
0610      VALUE1 = -1000
0620      DAUN1 = 1
0630      DAUN2 = 2
0640      CALL DASET( DAUN1, VALUE1 )
0650      CALL DASET( DAUN2, VALUE1 )
0660
0670 /*   SET UP CONDITIONS
0680       "A" REGISTER IS FOR INPUTS
0690       "B" REGISTER IS FOR OUTPUTS                   */
0700
0710      CNTRLA = $00
0720      DATA = $00
0730      CNTRLB = $00
0740      DATB = $FF
0750
```

```
0760 /*     SET UP CONTRL  REGISTERS TO ACCESS DATA   */
0770
0780       CNTRLA = $04
0790       CNTRLB = $04
0800       DATB   = $80
0810
0820 /*    FIND CALIBRATION VALUES
0830
0840    CALIB   = A/D UNITS PER POUND
0850    CONTRL  = TARGET VALUE FOR CONTROL
0860    ZERO1   = A/D LEVEL ON LEFT FOR ZERO FORCE
0870    ZERO2   = A/D LEVEL ON RIGHT FOR ZERO FORCE
0880    LCONS   = D/A VALUE TO APPLY TO LEFT FINGER AFTER PROX SIGNAL
0890    RCONS   = D/A VALUE TO APPLY TO RIGHT FINGER AFTER PROX SIGNAL
0900                                                                  */
0910
0920       CALL DSPLY<,, ADDR(STR0) >
0930       CALL RDVAL( CALIB )
0940
0950       CALL DSPLY<,, ADDR(STR1) >
0960       CALL RDVAL( THRESH )
0970
0980       ZERO2 = 0
0990       DO I = 1 TO 20
1000         CALL ADREAD<, 2, >
1010         GIVING<,, VALUE2 >
1020         ZERO2 = ZERO2 + VALUE2
1030       END
1040       ZERO2 = ZERO2 / 20
1050
1060       ZERO1 = 0
1070       DO I = 1 TO 20
1080         CALL ADREAD<, 1, >
1090         GIVING<,, VALUE1 >
1100         ZERO1 = ZERO1 + VALUE1
1110       END
1120       ZERO1 = ZERO1 / 20
1130
1140       Z1 = ZERO1
1150       Z2 = ZERO2
1160       CALL DSPLY<,, ADDR(STR9) >
1170
1180 /*    FIND BREAK-BEAM SWITCH VALUE AND OFFSET    */
1190
1200       CALL DSPLY<,, ADDR(STR2) >
1210       CALL RDVAL( SWITCH )
1220
1230       CALL DSPLY<,, ADDR(STR3) >
1240       CALL RDVAL( OFFSET )
1250
1260 /*    FIND LCONS AND RCONS                        */
1270
1280       CALL DSPLY<,, ADDR(STR4) >
1290       CALL RDVAL( LCONS )
1300
1310       CALL DSPLY<,, ADDR(STR5) >
1320       CALL RDVAL( RCONS )
1330
1340 /*    DATA RECEIVED FROM PDP-11 ( VIA DATA ):
1350          $00  -  RELEASE OBJECT AND RETURN HAND TO OPEN POSITION
1360          $01  -  CALL LOCATE
1370          $02  -  CALL CENTER
1380          ELSE -  CALL GRASP,  READ FORCE*8 LEVEL IN DATA BITS
```

```
1390
1400
1410        DATA SENT TO PDP-11 ( VIA DATB ):
1420           $80  -  CENTER OF OBJECT LOCATED, STOP JOGGING
1430                   OR INDETERMINATE STATUS BEFORE GRASPING
1440           $81  -  BEGIN JOG TO FIND CENTER OF OBJECT
1450           $82  -  FAR SIDE OF OBJECT IS LOCATED, BACK UP TO
1460                   FIND CENTER
1470           $83  -  HAND HAS GRASPED THE OBJECT, START MOVING
1480
1490
1500        NOTE - HIGH TO LOW TRANSITION OF BIT 8 OF DATB
1510               SWITCHES SOLENOID VALVE TO BEGIN MOTION
1520 */
1530
1540
1550 START: IF( DATA EQ $00 ) THEN
1560           DO
1570           VALUE1 = -1000
1580           CALL DASET( DAUN1, VALUE1 )
1590           CALL DASET( DAUN2, VALUE1 )
1600           END
1610
1620        IF( DATA EQ $01 ) THEN CALL LOCATE
1630
1640        IF( DATA EQ $02 ) THEN CALL CENTER
1650
1660        IF( DATA GT $02 ) THEN
1670           DO
1680           SWICHL = ZERO1 + THRESH
1690           SWICHR = ZERO2 + THRESH
1700           CONTRL = ZERO2 + CALIB * DATA / 8
1710           DATB = $00
1720           DATB = $80
1730           CALL GRASP
1740           END
1750
1760        CALL QUIT
1770        GOTO START
1780
1790        END

0010 /*   LOCATE FINDS THE CENTER OF THE OBJECT BY
0020      INTERACTING WITH THE ROBOT
0030
0040        A/D CHANNELS -  #5 - BREAK BEAM OUTPUT
0050                        #9 - ROBOT RADIUS
0060
0070        DATA SENT TO PDP-11 ( VIA DATB ):
0080           $80  -  CENTER OF OBJECT LOCATED, STOP JOGGING
0090           $81  -  BEGIN JOG TO FIND CENTER OF OBJECT
0100           $82  -  FAR SIDE OF OBJECT IS LOCATED, BACK UP TO
0110                   FIND CENTER
0120
0130 */
0140 LOCATE: PROCEDURE
0150        DCL RADI SIGNED BIN(2)
0160        DCL RADF SIGNED BIN(2)
0170        DCL VALUE SIGNED BIN(2)
0180        DCL SWITCH SIGNED BIN(2)  DEFINED $B00A
0190        DCL OFFSET SIGNED BIN(2)  DEFINED $B00C
0200        DCL DATA BIN DEFINED $E020
```

```
0210        DCL DATB BIN DEFINED $E022
0220
0230
0240 /*      TELL ROBOT TO START MOVING              */
0250
0260        DATB = $81
0270
0280
0290 /*     CHECK A/D VALUE ON CHANNEL 5  (BREAK-BEAM SENSOR)
0300            A/D#5  >  SWITCH     -  NO OBJECT
0310            A/D#5  <  SWITCH     -  OBJECT PRESENT       */
0320
0330 START: CALL ADREAD<, 5, >
0340         GIVING<,, VALUE>
0350         IF( VALUE > SWITCH ) THEN GOTO START
0360
0370
0380 /*      OBJECT IS ENCOUNTERED, READ RADIUS AND
0390        ASSIGN TO RADI                          */
0400
0410        CALL ADREAD<, 9, >
0420            GIVING<,, RADI >
0430
0440
0450 /*      LOOK FOR OTHER SIDE OF OBJECT, WHEN FOUND
0460        SET RADF                                */
0470
0480 CONT:  CALL ADREAD<, 5, >
0490        GIVING<,, VALUE >
0500        IF( VALUE < SWITCH )  THEN GOTO CONT
0510
0520
0530 /*      STOP ROBOT AND TELL IT TO BACK UP       */
0540
                DATA =
0550            ^   = $82
0560
0570        CALL ADREAD<, 9, >
0580            GIVING<,, RADF >
0590
0600
0610 /*      WHEN RADIUS REACHES MIDPOINT OF RADI AND RADF,
0620        TELL ROBOT TO STOP BY SENDING $80       */
0630
0640        RADI = ( ( RADI + RADF ) / 2 ) + OFFSET
0650
0660 WAIT:  CALL ADREAD<, 9, >
0670            GIVING<,, RADF >
0680            IF( RADF > RADI ) THEN GOTO WAIT
0690
0700        DATB = $80
0710
0720        RETURN
0730        END
0010 GRASP: PROCEDURE
0020    DCL GAIN1 SIGNED, GAIN2 SIGNED
0030    DCL SET, DAUN1, DAUN2
0040    DCL DATA BIN DEFINED $E020
0050    DCL DATB BIN DEFINED $E022
0060    DCL DAVA1  SIGNED BIN(2)
0070    DCL DAVA2  SIGNED BIN(2)
0080    DCL VALUE0 SIGNED BIN(2)
0090    DCL VALUE1 SIGNED BIN(2)
```

```
0100     DCL VALUE2 SIGNED BIN(2)
0110     DCL VALUE4 SIGNED BIN(2)
0120     DCL VALUE6 SIGNED BIN(2)
0130     DCL VALUE7 SIGNED BIN(2)
0140     DCL SWICHL SIGNED BIN(2) DEFINED $B000
0150     DCL SWICHR SIGNED BIN(2) DEFINED $B002
0160     DCL CONTRL SIGNED BIN(2) DEFINED $B004
0170     DCL LPOS   SIGNED BIN(2) DEFINED $B006
0180     DCL RPOS   SIGNED BIN(2) DEFINED $B008
0190     DCL LCONS  SIGNED BIN(2) DEFINED $B014
0200     DCL RCONS  SIGNED BIN(2) DEFINED $B016
0210
0220     DAUN1 = 1
0230     DAUN2 = 2
0240     GAIN1 = 8
0250     GAIN2 = 8
0260
0270     DAVA1 = 2000
0280     DAVA2 = 2000
0290     CALL DASET( DAUN1, DAVA1 )
0300     CALL DASET( DAUN2, DAVA2 )
0310
0320     LPOS = 0
0330     RPOS = 0
0340
0350 /*    CHECK FOR PROXIMITY SIGNALS                */
0360
0370 START: CALL ADREAD<, 6, >
0380      GIVING<,, VALUE6 >
0390      CALL ADREAD<, 7, >
0400      GIVING<,, VALUE7 >
0410
0420      IF( VALUE7 GT 500 ) THEN GOTO RPROX
0430      IF( VALUE6 GT 500 ) THEN GOTO LPROX
0440
0450      GOTO START
0460
0470
0480 RPROX: DAVA1 = LCONS
0490      DAVA2 = 2000
0500      CALL DASET( DAUN1, DAVA1 )
0510      CALL DASET( DAUN2, DAVA2 )
0520
0530 RPCNT: CALL ADREAD<, 6, >
0540      GIVING<,, VALUE6 >
0550      IF( VALUE6 GT 500 ) THEN GOTO BEGIN
0560
0570      GOTO RPCNT
0580
0590
0600 LPROX: DAVA1 = 2000
0610      DAVA2 = RCONS
0620      CALL DASET( DAUN1, DAVA1 )
0630      CALL DASET( DAUN2, DAVA2 )
0640
0650 LPCNT: CALL ADREAD<, 7, >
0660      GIVING<,, VALUE7 >
0670      IF( VALUE7 GT 500 ) THEN GOTO BEGIN
0680
0690      GOTO LPCNT
0700
0710
```

```
0720 /* SYSTEM HAS SWITCHED TO THE SOLENOID VALVES
0730    START CHECKING FOR A FORCE SIGNAL
0740    ON THE FINGERS                                    */
0750
0760 BEGIN: CALL ADREAD<, 1, >
0770        GIVING<,, VALUE1 >
0780        CALL ADREAD<, 2, >
0790        GIVING<,, VALUE2 >
0800
0810        IF( VALUE1 GT SWICHL ) THEN GOTO LEFT
0820        IF( VALUE2 GT SWICHR ) THEN GOTO RIGHT
0830
0840        GOTO BEGIN
0850
0860 RIGHT:     CALL ADREAD<, 4, >
0870           GIVING<,, RPOS >
0880           RPOS = RPOS + 25
0890           DAVA2 = 0
0900           CALL DASET( DAUN2, DAVA2 )
0910           DAVA1 = 2000
0920
0930 RCONT:     CALL ADREAD<, 1, >
0940           GIVING<,, VALUE1 >
0950           IF( VALUE1 GT SWICHL ) THEN GOTO CONT
0960           CALL DASET( DAUN1, DAVA1 )
0970
0980           CALL ADREAD<, 4, >
0990           GIVING<,, VALUE4 >
1000           DAVA2 = GAIN2 * ( VALUE4 - RPOS )
1010           CALL DASET( DAUN2, DAVA2 )
1020
1030           GOTO RCONT
1040
1050
1060 LEFT:      CALL ADREAD<, 0, >
1070           GIVING<,, LPOS >
1080           LPOS = LPOS + 25
1090           DAVA1 = 0
1100           CALL DASET( DAUN1, DAVA1 )
1110           DAVA2 = 2000
1120
1130 LCONT:     CALL ADREAD<, 2, >
1140           GIVING<,, VALUE2 >
1150           IF( VALUE2 GT SWICHR ) THEN GOTO CONT
1160           CALL DASET( DAUN2, DAVA2 )
1170
1180           CALL ADREAD<, 0, >
1190           GIVING<,, VALUE0 >
1200           DAVA1 = GAIN1 * ( VALUE0 - LPOS )
1210           CALL DASET( DAUN1, DAVA1 )
1220
1230           GOTO LCONT
1240
1250
1260 /* CONTACT HAS BEEN MADE
1270    FIND CURRENT VALUE FOR LH FINGER                   */
1280
1290 CONT:  IF( LPOS NE 0 ) THEN GOTO CNTRL
1300        CALL ADREAD<, 0, >
1310        GIVING<,, LPOS >
1320
1330
```

```
1340 /*    START FORCE CONTROL  LOOP                    */
1350
1360 CNTRL:CALL ADREAD<, 2, >
1370       GIVING<,, VALUE2 >
1380       DAVA2 = GAIN2 * ( CONTRL  - VALUE2 )
1390         IF( DAVA2 GT 2047 ) THEN DAVA2 = 2047
1400         IF( DAVA2 LT -2047 ) THEN DAVA2 = -2047
1410       CALL DASET( DAUN2, DAVA2 )
1420
1430 /*    START POSITION CONTROL LOOP                   */
1440
1450       CALL ADREAD<, 0, >
1460       GIVING<,, VALUE0 >
1470       DAVA1 = GAIN1 * ( VALUE0 - LPOS )
1480         IF( DAVA1 GT 2047 ) THEN DAVA1 = 2047
1490         IF( DAVA1 LT -2047 ) THEN DAVA1 = -2047
1500       CALL DASET( DAUN1, DAVA1 )
1510
1520 /*         TELL ROBOT THAT HAND HAS OBJECT           */
1530
1540       DATB = $83
1550
1560 /*         CHECK FOR COMMAND TO CENTER HAND          */
1570
1580       IF( DATA LT $03 ) THEN RETURN
1590
1600       GOTO CNTRL
1610       END

0010 /*    CENTER POSITIONS THE TWO FINGERS AT THE SAME
0020      DISPLACEMENT VALUE WHILE MAINTAINING A
0030          CONSTANT GRASPING FORCE
0040 */
0050
0060 CENTER: PROCEDURE
0070     DCL GAIN1 SIGNED, GAIN2 SIGNED
0080     DCL POS BIN, FORCE BIN
0090     DCL DATA BIN DEFINED $E020
0100     DCL DAVA1 SIGNED BIN(2), DAVA2 SIGNED BIN(2)
0110     DCL VALUE2  SIGNED BIN(2)
0120     DCL CONTRL  SIGNED BIN(2)    DEFINED $B004
0130     DCL LPOS    SIGNED BIN(2)    DEFINED $B006
0140     DCL RPOS    SIGNED BIN(2)    DEFINED $B008
0150     DCL ZERO1   SIGNED BIN(2)    DEFINED $B010
0160     DCL ZERO2   SIGNED BIN(2)    DEFINED $B012
0170
0180
0190       POS = 1
0200       FORCE = 2
0210       GAIN1 = 8
0220       GAIN2 = 8
0230
0240
0250 /*       SELECT CORRECT CHANNEL FOR OUTPUT
0260
0270           THE FINGER THAT MUST MOVE TOWARDS THE CENTER
0280           ( I.E. "CLOSE" ) IS POSITION CONTROLLED SINCE
0290           IT HAS THE SLOWEST RESPONSE                  */
0300
0310
0320       CALL ADREAD<, 0, >
0330          GIVING<,, LPOS >
0340       CALL ADREAD<, 4, >
```

```
0350            GIVING<,, RPOS >
0360        IF( RPOS GT LPOS ) THEN
0370            DO
0380            POS = 2
0390            FORCE = 1
0400            GAIN1 = -8
0410            CONTRL = ZERO1 - ZERO2 + CONTRL
0420            END
0430
0440
0450 /*     START FORCE CONTROL LOOP                        */
0460
0470 START: CALL ADREAD<, FORCE, >
0480            GIVING<,, VALUE2 >
0490        DAVA2 = GAIN2 * ( CONTRL - VALUE2 )
0500            IF( DAVA2 GT 2047 ) THEN DAVA2 = 2047
0510            IF( DAVA2 LT -2047 ) THEN DAVA2 = -2047
0520        CALL DASET( FORCE, DAVA2 )
0530
0540
0550 /*     START POSITION CONTROL LOOP                     */
0560
0570        CALL ADREAD<, 0, >
0580            GIVING<,, LPOS >
0590        CALL ADREAD<, 4, >
0600            GIVING<,, RPOS >
0610
0620        DAVA1 = GAIN1 * ( LPOS - RPOS )
0630            IF( DAVA1 GT 2047 ) THEN DAVA1 = 2047
0640            IF( DAVA1 LT -2047 ) THEN DAVA1 = -2047
0650
0660        CALL DASET( POS, DAVA1 )
0670
0680        IF( DATA EQ $00 ) THEN RETURN
0690
0700        GOTO START
0710        END

0010 ADREAD: PROCEDURE< ADUNIT, >
0020        DCL ADUNIT BIN
0030        DCL ADADDR  BIN DEF $E00A
0040        DCL STROBE  BIN DEF $E00B
0050        DCL STATUS  BIN DEF $E00C
0060        DCL RESULT  SIGNED BIN(2) DEF $E00D
0070 /*
0080      START A/D READ
0090 */
0100 START: ADADDR = ADUNIT
0110        STROBE = $11
0120        IF( STATUS LT $80 ) THEN GOTO START
0130 READ:  IF( RESULT LT 2048 ) THEN GOTO FINISH
0140        RESULT = RESULT - 4096
0150 FINISH:RETURN<,, RESULT>
0160 END
0010 DASET:  PROCEDURE ( UNIT, VALUE )
0020            DCL UNIT BIN, VALUE SIGNED BIN(2)
0030            DCL UNIT1 BIN(2) DEF $E006
0040            DCL UNIT2 BIN(2) DEF $E004
0050 /*         */
0055            IF ( VALUE LT $00 ) THEN VALUE=VALUE+4096
```

```
0060            IF( UNIT EQ $01 ) THEN
0070                UNIT1 = VALUE
0080            ELSE
0100                UNIT2 = VALUE
0110            RETURN
0120            END
0010 /*
0020      PROGRAM CHECKS FOR ANY KEY DEPRESSION
0030      IF IT FINDS ONE, IT RETURNS CONTROL TO MDOS
0040 */
0050 QUIT: PROCEDURE
0060 $ LDAA $FCF4
0070 $ ASRA
0080 $ BCS STOP
0090        RETURN
0100 STOP: CALL DASET( 1, 0 )
0110        CALL DASET( 2, 0 )
0120        CALL MDOS
0130        RETURN
0140        END
0010 /* PROCEDURE
0020          READS IN A VALUE FROM THE KEYBOARD
0030    WITHOUT  SPECIFYING ALL DIGITS IN ADVANCE
0040 */
0050 RDVAL: PROCEDURE ( VALUE )
0060        DCL INPUT CHAR(7) DEF $B000
0070        DCL DIGIT(7) BIN DEF $B000
0080        DCL PLUS SIGNED BIN(2)
0090        DCL VALUE SIGNED BIN(2)
0100        DCL STRING CHAR(4) INIT('VAL=')
0110        DCL CR BIN INIT($0D)
0120        DCL LF BIN INIT($0A)
0130        DCL ERROR CHAR(25) INIT('ERROR IN INPUT, VALUE = 0')
0140        DCL CR1 BIN INIT($0D)
0150        DCL LF1 BIN INIT($0A)
0160        DCL K BIN, I BIN, NUM BIN
0170 /*          */
0180    CALL DSPLY<,, ADDR(STRING) >
0190    CALL KEYIN<, 6, ADDR(INPUT) >
0200           GIVING<, NUM >
0220 /*  START LOOKING FOR FIRST VALID DIGIT   */
0240        DO I = 1 TO NUM
0250           IF( DIGIT(I) NE $20 ) THEN GOTO START
0260        END
0270        CALL DSPLY<,, ADDR(ERROR) >
0280        VALUE = 0
0290        GOTO FINISH
0300 /*
0310     VALID INPUT
0320 */
0330 START: IF( DIGIT(I) EQ $2D ) THEN
0340         DO
0350           PLUS = -1
0360           VALUE = 0
0370         END
0380        ELSE
0390         DO
0400           PLUS = 1
0410           VALUE = DIGIT(I) - $30
0420         END
0430 /*
0440     CHECK FOR ONLY ONE DIGIT
0450 */
```

```
0460            IF( I EQ NUM ) THEN GOTO FINISH
0470  /*
0500        FINISH REST OF VALUE
0520  */
0530            I = I + 1
0540            DO K = I TO NUM
0550              VALUE = ( DIGIT(K) - $30 ) + ( VALUE * 10 )
0560            END
0570            VALUE = PLUS * VALUE
0580  FINISH: RETURN
0590            END
```

What is claimed is:

1. An apparatus for controlling the grasping of an object located within the acquisition envelope of a robot hand, the apparatus comprising:
   means for contacting the object, said contacting means being carried by the robot hand and being moveable with respect to the hand so as to be able to assist in grasping the object;
   means for imparting a first non-zero velocity to said contacting means in the same direction as the direction of the grasping force to be applied to grasp the object;
   means for braking said first velocity to a second non-zero velocity in said grasping direction;
   non-contact sensory means for sensing a point of close approach between the object and said contacting means, said non-contact sensory means actuating said braking means upon sensing said point of close approach to attain said second non-zero velocity; and
   means for controlling the touch force between said contacting means and the object.

2. An apparatus as in claim 1, wherein said means for imparting a first velocity to the contacting means in a first direction comprises:
   a pneumatic cylinder having a piston therein, said piston having a piston rod attached at one end to the contacting means and at the other end to said piston and separating said cylinder into a first chamber and a second chamber;
   a pneumatic supply circuit connected to said cylinder, carrying a supply pressure to said cylinder, and having two on/off pneumatic solenoid valves for controlling the pressure supplied to said chambers.

3. An apparatus as in claim 2, wherein said sensory means comprises:
   at least one infrared light-emitting diode (LED);
   at least one infrared light photodetector; and
   at least one housing containing at least one said LED and one said photodetector, each said housing being mounted near the free end of the contacting means and facing toward the center of the acquisition envelope of the robot hand.

4. An apparatus for controlling the grasping of an object located within the acquisition envelope of a robot hand having means for contacting the object, the apparatus comprising:
   means for imparting a first velocity to the contacting means in a grasping direction, said velocity imparting means including:
   (i) a pneumatic cylinder having a piston therein, said piston having a piston rod attached at one end to the contacting means and at the other end to said piston and separating said cylinder into a first chamber and a second chamber; and
   (ii) a pneumatic supply circuit connected to said cylinder, carrying a supply pressure to said cylinder, and having two on/off pneumatic solenoid valves for controlling the pressure supplied to said chambers;
   sensory means for sensing a point of close approach between the object and the contacting means, said sensory means including:
   (i) at least one infrared light-emitting diode (LED);
   (ii) at least one infrared light photodetector; and
   (iii) at least one housing containing at least said one LED and said one photodetector, each said housing being mounted near the free end of the contacting means and facing toward the center of the acquisition envelope of the robot hand;
   means for braking said first velocity to a second velocity in said grasping direction including:
   (i) a pneumatic proportional servovalve having a maximum flow rate less than said solenoid valves and forming an element of said pneumatic supply circuit such that when said solenoid valves are activated in the on mode of operation, said servovalve is bypassed by the supply pressure carried by said pneumatic supply circuit to said cylinder and said supply pressure is applied to said cylinder through at least one of said solenoid valves, and further such that when said solenoid valves are operating in the off mode of operation, said supply pressure of said pneumatic supply circuit is applied through said servovalve to said pneumatic cylinder; and
   (ii) an analog control circuit receiving signals from said sensory means, comparing said received signals to a predetermined threshold level signal, and sending an activation signal to said pneumatic solenoid valves to switch said solenoid valves into their off mode of operation upon said analog control circuit receiving a signal from said sensory means that equals or exceeds said threshold level signal; and
   means for controlling the touch force between the contacting means and the object.

5. An apparatus as in claim 4, wherein said means for braking said first velocity to a second velocity in said grasping direction further comprises a robot hand control means receiving from said analog control circuit said activation signal and controlling said servovalve to apply a maximum pressure differential across said piston of said cylinder such that the contacting means attains a second velocity lower than said first velocity in the same direction as said first velocity.

6. An apparatus as in claim 4, wherein said means for controlling the touch force between the contacting means and the object comprises:
   means for sensing the impact between the contacting means and the object, said impact sensing means generating a force output signal according to the force sensed by said impact force sensing means;
   a robot hand control means having memory means storing a first threshold level force signal, said robot hand control means receiving a force output signal from said impact sensing means, comparing said force output signal to said first threshold level force signal, and actuating said servovalve to equilibrate said chambers of said pneumatic cylinder to stop movement of said contacting means upon receiving a force output signal from said impact sensing means equal to at least said first threshold level force signal.

7. An apparatus as in claim 6, wherein said robot hand control means comprises a programmable electronic microcomputer with two accessory interface boards.

8. An apparatus as in claim 7, wherein one of said accessory interface boards provides at least 8 channels of analog to digital output for reading outputs from said sensory means and said impact sensing means and 2 channels of digital to analog input to drive at least one operational amplifier connected to said servovalve and wherein a second of said accessory interface boards provides 8 channels of digital input/output for communicating with a robot arm control, digital computer.

9. An apparatus as in claim 6, wherein said impact sensing means comprises at least one strain gage mounted near the free end of the contacting means and facing toward the acquisition envelope of the robot hand.

10. An apparatus as in claim 6, wherein said impact sensing means comprises a microswitch mounted near the free end of the contacting means and on a closing surface thereof such that activation of said microswitch occurs upon application of a predetermined force level to said microswitch, said microswitch generating a force output signal upon application of said predetermined force level to said microswitch.

11. An apparatus as in claim 9, wherein said analog control circuit comprises:
at least one potentiometer for setting sensory means thresholds;
at least one operational amplifier for comparing sensory means thresholds;
at least two NAND gates for implementing a latch for a solenoid relay;
a retriggerable monostable multivibrator for strobing a NAND gate latch; and
an alternating current relay for said solenoid valves.

12. An apparatus as in claim 4, wherein said pneumatic supply circuit comprises:
a supply line having a first branch supply line and a second branch supply line, said first branch supply line being connected to an input port of a first one of said solenoid valves, and said second branch supply line being connected to an input port of said servovalve;
a first cylinder line connected at one end to a first chamber of said pneumatic cylinder, said first chamber enclosing said piston rod, said first cylinder line having a second end connected to an output port of said first one of said solenoid valves;
an intermediate line connected at one end to an output port of said servovalve and at the other end to an input port of said first one of said solenoid valves; and
a second cylinder line connected at one end to said second chamber of said pneumatic cylinder and having a first branch cylinder line connected to an input port of a second one of said solenoid valves and a second branch cylinder line connected to an output port of said servovalve.

13. An apparatus for controlling the grasping of an object located within the acquisition envelope of a robot hand, the apparatus comprising:
means for contacting the object, said contacting means being carried by the robot hand and being moveable with respect to the hand so as to be able to assist in grasping the object;
means for imparting a first non-zero velocity to said contacting means in the same direction as the direction of the grasping force to be applied to grasp the object;
means for braking said first velocity to a second non-zero velocity in said grasping direction;
non-contact sensor means for sensing a point of close approach between the object and said contacting means, said non-contact sensory means comprising a light-emitting diode and a photodarlington, said light-emitting diode and photodarlington each having a diverging lens, said non-contact sensory means actuating said braking means upon sensing said point of close approach to attain said second-non-zero velocity; and
means for controlling the touch force between said contacting means and the object.

14. A method controlling the grasping of an object located within the acquisition envelope of a robot hand carrying at least one means for moving with respect to the hand and contacting the object, the method comprising:
imparting a first velocity to the contacting means in the same direction as the direction of the grasping force to be applied to grasp the object;
sensing a point of close approach between the contacting means and the object without first physically contacting the object;
braking said first velocity to a second velocity; and
controlling the touch force between the contacting means and the object to a predetermined touch force selected from a range of possible touch forces.

15. A method as in claim 14, wherein said step of imparting a first velocity to the contacting means in a first direction comprises:
providing a pneumatic cylinder having a piston therein, said piston having a piston rod attached at one end to the contacting means and at the other end to said piston and dividing said cylinder into a first chamber and a second chamber;
providing a pneumatic supply circuit connected to said cylinder and having two on/off pneumatic solenoid valves for controlling the pressure supplied to said chambers; and
providing supply pressure to said cylinder through said solenoid valves upon actuation of said solenoid valves to their on mode of operation.

16. A method as in claim 15, wherein said step of sensing a point of close approach between the contacting means and the object comprises:
providing at least one infrared light-emitting diode (LED), at least one infrared light photodetector, and a housing containing at least one said LED and one said photodetector, said housing being mounted near the free end of the contacting means and facing toward the center of the acquisition envelope of the robot hand.

17. A method of controlling the grasping of an object located within the acquisition envelope of a robot having a means for contacting the object, the method comprising:

imparting a first velocity to the contacting means in a first direction, said velocity imparting step including:

(i) providing a pneumatic cylinder having a piston therein, said piston having a piston rod attached at one end to the contacting means and at the other end to said piston and dividing said cylinder into a first chamber and a second chamber;

(ii) providing a pneumatic supply circuit connected to said cylinder and having two on/off pneumatic solenoid valves for controlling the pressure supplied to said chambers; and (iii) providing supply pressure to said cylinder through said solenoid valves upon actuation of said solenoid valves to their on mode of operation;

sensing a point of close approach between the contacting means and the object, said sensing step including providing ar least one infrared light-emitting diode (LED), at least one infrared light photodetector, and a housing containing at least one said LED and one said photodetector, said housing being mounted near the free end of the contacting means and facing toward the center of the acquisition envelope of the robot hand;

braking said first velocity to a second velocity, said step of braking said first velocity to a second velocity including:

(i) providing a pneumatic servovalve as an additional element of said pneumatic supply circuit such that when said solenoid valves are activated to the on mode of operation, said servovalve is bypassed by the supply pressure carried by said supply circuit to said cylinder and said supply pressure is applied to said cylinder through at least one of said solenoid valves, and further such that when said solenoid valves are operating in the off mode of operation, said supply pressure of said pneumatic circuit is applied through said servovalve to said pneumatic cylinder; and (ii) providing an analog control circuit for receiving signals from said sensory means, said analog circuit receiving signals from said sensory means, comparing said received signals to a predetermined threshold level signal, and activating said pneumatic solenoid valves into their off mode of operation upon receiving a signal from said sensory means that equals or exceeds said predetermined threshold level signal; and controlling the touch force between the contacting means and the object.

18. A method as in claim 17, wherein said step of controlling the touch force between the contacting means and the object comprises:

sensing the impact between the contacting means and the object with an impact sensing means and generating a force output signal according to the force detected by said impact sensing means;

receiving a force output signal from said impact sensing means, comparing said force output signal to a first threshold level force signal, and actuating said servovalve to equilibrate said chambers of said pneumatic cylinder to stop movement of said contacting means upon receiving a force output signal from said impact sensing means equal to or exceeding said first threshold level force signal.

19. A method as in claim 18, wherein said step of sensing the impact comprises providing at least one strain gage mounted near the free end of the contacting means and facing toward the acquisition envelope of the robot hand.

20. A method as in claim 18, wherein said step of sensing the impact comprises providing a microswitch mounted on a closing surface of the contacting means such that activation of said microswitch occurs upon application of a predetermined force level to said microswitch, said microswitch generating a force output signal upon application of said predetermined force level to said microswitch.

21. A method as in claim 17, wherein said step of providing an analog control circuit comprises:

providing at least one potentiometer and setting said potentiometer with a sensory means threshold;

providing at least one operational amplifier and comparing said sensory means thresholds with said operational amplifier;

providing at least two NAND gates and using said NAND gates to implement a latch for a solenoid relay;

providing a retriggerable monostable multivibrator and using said multivibrator to strobe a NAND gate latch; and providing an alternating current relay for said solenoid valves.

22. A method as in claim 18, wherein said step of providing a pneumatic supply circuit comprises:

providing a supply line having a first branch supply line and a second branch supply line, said first branch supply line being connected to an input port of a first one of said solenoid valves, and said second branch supply line being connected to an input port of said servovalve;

providing a first cylinder line connected at one end to a first chamber of said pneumatic cylinder, said first chamber enclosing said piston shaft, said first cylinder line having a second end connected to an output port of said first one of said solenoid valves;

providing an intermediate line connected at one end to an output port of said servovalve and at the other end to an input port of said first one of said solenoid valves;

providing a second cylinder line connected at one end to said second chamber of said pneumatic cylinder and having a first branch cylinder line connected to an input port of a second one of said solenoid valves and a second branch connected to an output port of said servovalve.

* * * * *

UNITED STATES PATENT AND TRADEMARK OFFICE
CERTIFICATE OF CORRECTION

PATENT NO. : 4,783,107
DATED : November 8, 1988
INVENTOR(S) : Joey K. Parker and Frank W. Paul It is certified that error appears in the above-identified patent and that said Letters Patent is hereby corrected as shown below:

Column 1, line 38, after "tool" add --changing--.

Column 2, line 46, after "only" add --a--.

Column 5, line 9, after "58 " add --(--.

Column 5, line 15, change "low" to read --flow--.

Column 5, line 62, change "not" to read --not--.

Column 7, line 58, change "valves 8, 50," to read --valves 48, 50,--.

Column 8, line 14, change " "NAND38" to read --"NAND"--.

Column 8, line 27, after "since" add --the--.

Column 8, line 29, change "co" to read --controlled--.

Column 8, line 30, before "approximately" insert --resistance is--.

Column 8, line 30, after current" add --proportional--.

Column 8, line 31, after "steadystate" add --or--.

Column 8, line 33, change "by" to read --experimentally--.

Column 8, line 36, after "($P_s$)" add --of--.

UNITED STATES PATENT AND TRADEMARK OFFICE
CERTIFICATE OF CORRECTION

PATENT NO. : 4,783,107
DATED : November 8, 1988
INVENTOR(S) : Joey K. Parker and Frank W. Paul It is certified that error appears in the above-identified patent and that said Letters Patent is hereby corrected as shown below:

Column 8, line 38, before "FIGS. 13" insert --given in--.

Column 8, line 38, after "are" add --normally--.

Column 8, line 40, after "a" add --programmable--.

Column 8, line 42, after "the" (second occurrence) add --on--

Column 8, line 43, change "n" to read --normally--.

Column 8, line 44, after "ing" add --network--.

Column 8, line 45, before "means" add --sensory--.

Column 8, line 50, change "o" to read --of analog--.

Column 8, line 51, after "calibrated" add --threshold--.

Column 8, line 52, after "from" add --low--.

Column 8, line 53, change "o" to read --of--.

Column 8, line 54, change "t" to read --to the--.

Column 8, line 55, after "or" add --both--.

Column 8, line 56, change "a" to read --allows--.

Column 11, line 42, delete "=".

UNITED STATES PATENT AND TRADEMARK OFFICE
CERTIFICATE OF CORRECTION

PATENT NO. : 4,783,107
DATED : November 8, 1988
INVENTOR(S) : Joey K. Parker and Frank W. Paul It is certified that error appears in the above-identified patent and that said Letters Patent is hereby corrected as shown below:

Column 11, line 53, change "gets" to read --sets--.

Column 12, line 37, delete "s".

Column 12, line 50, change "!02" to read --102--.

Column 12, line 51, change "5" to read --52--.

Column 12, line 58, change "disconnected" to read --is connected--.

Column 12, line 60, change "11" to read --110--.

Column 13, line 26, change "on" to read --of--.

Column 13, line 28, change "her-in" to read --herein--.

Column 14, line 37, change "velo-velocity" to read --velocity--.

UNITED STATES PATENT AND TRADEMARK OFFICE
CERTIFICATE OF CORRECTION

PATENT NO. : 4,783,107

DATED : November 8, 1988

INVENTOR(S) : Joey K. Parker and Frank W. Paul

It is certified that error appears in the above-identified patent and that said Letters Patent is hereby corrected as shown below:

Column 38, line 26, Claim 14, after "method" add --of--.

Signed and Sealed this

First Day of August, 1989

Attest:

DONALD J. QUIGG

Attesting Officer

Commissioner of Patents and Trademarks